United States Patent [19]
Yumde et al.

[11] 3,941,921
[45] Mar. 2, 1976

[54] SYSTEM FOR CONVERTING FREQUENCY BAND OF PICTURE SIGNAL

[75] Inventors: Yasufumi Yumde; Takashi Furuhata, both of Yokohama, Japan

[73] Assignee: Hitachi, Ltd., Japan

[22] Filed: Sept. 12, 1973

[21] Appl. No.: 396,440

[30] Foreign Application Priority Data
Sept. 18, 1972 Japan.............................. 47-92929
Sept. 18, 1972 Japan.............................. 47-92930

[52] U.S. Cl............................. 178/6; 178/DIG. 24
[51] Int. Cl.²......................................... H04N 1/28
[58] Field of Search............ 178/DIG. 3, DIG. 24, 6, 178/6.8

[56] References Cited
UNITED STATES PATENTS

| | | | |
|---|---|---|---|
| 2,955,157 | 10/1960 | Young | 178/DIG. 3 |
| 3,334,193 | 8/1967 | Dow | 178/DIG. 3 |
| 3,749,836 | 7/1973 | Hayami | 178/DIG. 3 |
| 3,806,644 | 4/1974 | Browne | 178/DIG. 24 |

Primary Examiner—Howard W. Britton
Assistant Examiner—Michael A. Masinick
Attorney, Agent, or Firm—Craig & Antonelli

[57] ABSTRACT

A system for converting a broad-band picture signal into a narrow-band signal or converting a narrow-band picture signal into a broad-band signal comprising a first memory means which has a capacity of storing a picture signal corresponding to one frame and can record and reproduce a broad-band picture signal at the same speed as the transmitted speed, and a second memory means which has a capacity of storing a picture signal corresponding to one scanning line and is such that writing speed and reading speed can be freely varied. In broad-to-narrow conversion, a broad-band picture signal corresponding to one frame is stored in the first memory means and is read out repeatedly from the first memory means at a speed equal to the speed with which a picture signal is commonly transmitted, and individual line signals appearing from the first memory means are successively written in the second memory means at a suitable time interval and are read out from the second memory means at a low speed corresponding to the desired frequency band. In narrow-to-broad conversion, individual line signals of a broad-to-narrow converted picture signal are successively written in the second memory means at a low speed and are read out therefrom at a high speed to be written in the first memory means, and after the signal corresponding to one frame is written in the first memory means according to the order of the scanning lines, this signal is read out from the first memory means to provide a broad-band picture signal. A plurality of second memory means may be provided so as to improve the efficiency in respect of time of transfer of the signal from the first to the second memory means or from the second to the first memory means and to reduce the period of time occupied by the broad-to-narrow converted frame signal.

10 Claims, 15 Drawing Figures

SYSTEM FOR CONVERTING FREQUENCY BAND OF PICTURE SIGNAL

BACKGROUND OF THE INVENTION

This invention relates to systems for converting the frequency band of electrical picture information signals, and more particularly to a system of the kind above described which is suitable for the transmission or recording and reproduction of a still picture or a frame of a television signal by means of a transmission medium having a narrow frequency band characteristic such as a telephone line or audio magnetic tape.

There are various conventional methods for converting the frequency band of an electrical picture information signal. A first method comprises employing a rotary memory such as a magnetic disk, magnetic sheet, magnetic drum or endless magnetic tape having a capacity of storing one frame portion of electrical picture information signal and varying the rotating speed of the rotary memory depending on the writing operation and reading operation. A second method comprises employing a stationary memory such as a magnetic core memory, magnetic wire memory, semiconductor shift register memory or capacitor memory having a capacity of storing one frame portion of electrical picture information signal and varying the frequency of clock pulses depending on the writing operation and reading operation. A third method comprises employing a memory of the electron beam scanning type such as a charge storage tube memory having a capacity of storing one frame portion of electrical picture information signal and varying the scanning rate depending on the writing operation and reading operation. However, these conventional methods have the following defects: The first method employing the rotary memory is defective in the lack of quick responsiveness due to the fact that an elongated stabilizing period of time is required during change-over of the rotating speed. The second method employing the stationary memory is defective in that the memory is more expensive than those in any other methods and thus this method is not economical. The third method employing the memory of the electron beam scanning type is defective in that satisfactory fidelity for the transmitted signal is difficult to obtain.

SUMMARY OF THE INVENTION

It is an object of the present invention to provide an economical frequency band coverting system which is suitable for converting a broad-band picture signal into a narrow-band signal or converting a narrow-band picture signal into a broad-band signal so that such broad-band picture signal can be transmitted or recorded in the form of the narrow-band signal or the narrow-band signal which is transmitted or recorded and then reproduced can be converted into the broad-band picture signal again.

Another object of the present invention is to provide a frequency band converting system of the kind above described which operates with a quick response characteristic and ensures satisfactory fidelity for the transmitted signal.

A further object of the present invention is to provide a frequency band converting system which can efficiently reduce the period of time required for the transmission of the broad-to-narrow converted signal.

In order to attain the objects above described, the present invention comprises in combination a rotary memory having a capacity of storing one frame portion of a picture information signal and a stationary memory having a smaller capacity than the rotary memory, the former being driven at a constant speed, while the latter being driven at different speeds depending on the writing operation and reading operation so as to effectively utilized the merits of these memories thereby obviating the defects encountered with the conventional methods.

At first, one frame portion of a broad-band picture signal is recorded at a high speed in the rotary memory and is then reproduced repeatedly. Then, a signal portion corresponding to, for example, one scanning line is derived from this reproduced signal and is written at a high speed in the stationary memory. This signal portion is then read out at a low speed from the stationary memory to obtain a narrow-band signal portion corresponding to one scanning line. Upon completion of this low-speed reading operation, another signal portion corresponding to the next scanning line is derived from the signal reproduced from the rotary memory and is written at a high speed in the stationary memory again. This signal portion is similarly read out at a low speed from the stationary memory to obtain another narrow-band signal portion. By the repetition of the above operation, one frame portion of the broad-band picture signal recorded in the rotary memory can be converted into a narrow-band signal. Upon completion of the conversion of one frame portion of the broad-band signal, another frame portion is recorded in the rotary memory again. In this manner, the broad-band signal can be converted into a narrow-band signal.

Another stationary memory capable of storing one scanning line portion of a picture signal and another rotary memory capable of storing one frame portion of a picture signal are provided for carrying out an operation reverse to that above described so that the broad-band picture signal converted into the narrow-band signal can be converted into the broad-band picture signal again. In this specification, the term "transfer" is used to denote an operation in which a signal stored in a memory is read out to be written in another memory. Further, the memory capable of storing one frame portion of a picture signal is called a main memory, and the memory having the smaller capacity than the main memory is called a sub-memory.

In the present invention, a plurality of such stationary memories or sub-memories may be employed so that the waiting time required for the matching of transmission timing between the two kinds of memories can be eliminated from the transmission time and the period of time required for transmission of the narrow-band signal can be reduced to a minimum. Further, a frame index signal indicating the initiation of one frame and a line index signal indicating the initiation of one scanning line may be added to the broad-to-narrow converted signal and the sub-memory may only handle the net picture information except the synchronizing signal, blanking period, etc. in the picture signal so that the period of time required for transmission of the narrow-band signal can be further reduced.

DESCRIPTION OF THE PREFERRED EMBODIMENTS

Figure 1:
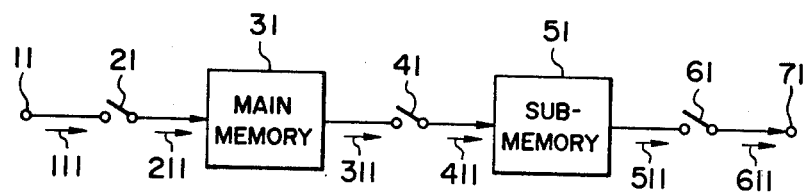
FIG. 1 is a block diagram showing the basic structure of a system for converting a broad-band signal into a narrow-band signal according to the present invention.
Figure 2:
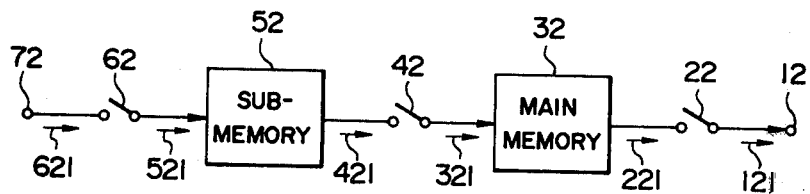
FIG. 2 is a block diagram showing the basic structure of a system for converting a narrow-band signal into a broad-band signal according to the present invention.
Figure 3:
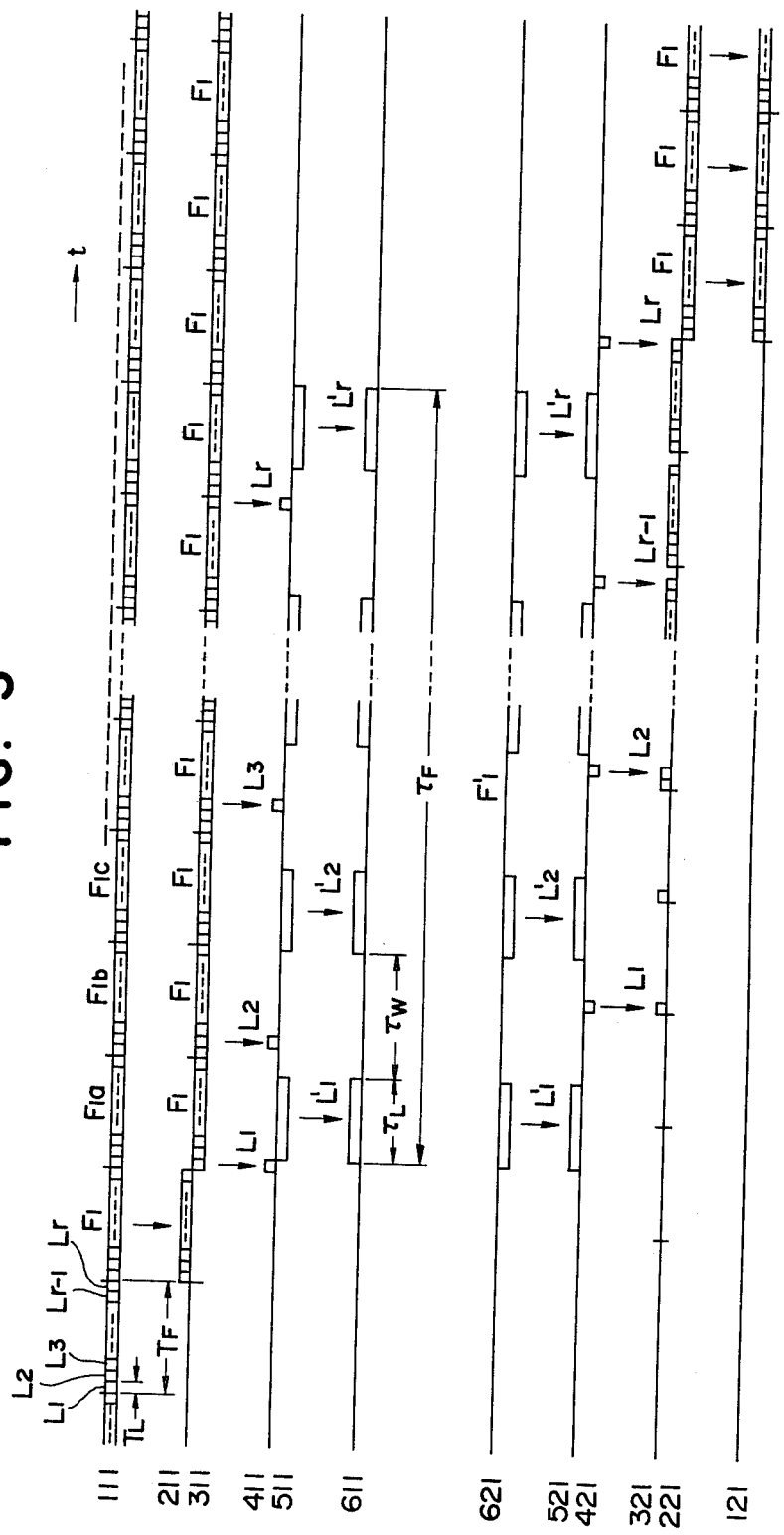
FIG. 3 is a timing chart for illustrating the operation of the systems shown in FIGS. 1 and 2.

FIGS. 1 and 2 are block diagrams of a broad-to-narrow converting system and a narrow-to-broad converting system respectively each including one main memory and one sub-memory, and FIG. 3 is a timing chart for illustrating the operation of these systems.

Referring to FIG. 1, a main memory 31 is a broad-band frames memory having a capacity of storing a picture signal corresponding to one frame and is of the rotary type such as a magnetic disk. A sub-memory 51 has a capacity of storing a picture signal corresponding to one scanning line and is of the stationary type.

A broad-band picture signal 111 arrives at an input terminal 11 and consists of a series of picture signals or frame signals $F_1, F_{1a}, F_{1b} \ldots$ corresponding to different frames as shown in FIG. 3. The frame signal $F_1$ shown in FIG. 3 is solely subjected to conversion into a narrow-band signal and the other frame signals $F_{1g}, F_{1b}, \ldots$ are unnecessary, but the latter signals are shown therein for convenience. Each frame signal is composed of picture signals or line signals $L_1, L_2, L_3, \ldots L_r$ separated by $r$ scanning lines. Thus, the relation $T_F = rT_L$ holds where $T_F$ is the period of one frame and $T_L$ is the period of one scanning line.

In response to the application of the broad-band picture signal $F_1$ corresponding to the frame to be subjected to broad-to-narrow conversion, a switch 21 is closed for the period of time corresponding to this frame and a picture signal 211 corresponding to this frame is written in the main memory 31. Upon completion of writing of the signal 211, this signal 211 is immediately read out and an output 311 appears from the main memory 31. The output 311 of the main memory 31 includes a series of the same signals repeated with the frame period $T_F$ and consists of a train of the broad-band signals $F_1$ corresponding to the specific frame. Then, the output 311 of the main memory 31 is transferred to the sub-memory 51 according to the order of the scanning lines constituting the frame. In this transfer operation, a switch 41 is closed for the period of time corresponding to the line signal $L_1$ so that the line signal $L_1$ corresponding to the first scanning line is written in the sub-memory 51 as shown by 411 in FIG. 3. The sub-memory 51 is a scanning line memory which has a capacity of storing a picture signal corresponding to one scanning line. Such line signal can be written in the sub-memory 51 at any desired speed and can be read out from the sub-memory 51 at any desired speed. Upon completion of writing of the line signal $L_1$ in the sub-memory 51, this signal $L_1$ is immediately read out at a low speed and a narrow-band picture signal $L'_1$, corresponding to the first scanning line appears from the sub-memory 51 as shown by 511 in FIG. 3. The period of time $\tau_L$ for reading out the narrow-band picture signal $L'_1$ is determined by a predetermined band conversion ratio $\alpha^{-1} = T_L/\tau_L$. During the lowspeed reading of the signal 511 from the sub-memory 51, a switch 61 is closed to obtain a narrow-band picture signal 611 which is sent out to the exterior from an output terminal 71.

When the line signal $L_2$ corresponding to the next scanning line is read out from the main memory 31 after the narrow-band picture signal $L'_1$ has been read out from the sub-memory 51, the switch 41 is closed again to transfer this line signal $L_2$ to the sub-memory 51 so as to read out a narrow-band picture signal $L'_2$ therefrom. However, after the transfer of this line signal $L_2$, the narrow-band picture signal $L'_2$ corresponding to the next scanning line cannot immediately appear at the output terminal of the sub-memory 51, and read-out of this signal $L'_2$ must be started after waiting for a period of time $\tau_W$ after the preceding signal $L'_1$ has been read out. This is necessary for the following reasons: In the transfer of the signals $L_1, L_2, L_3, \ldots$ from a sub-memory to a main memory in a narrow-to-broad converting system described later, a waiting time at least equal to one frame period $T_F$ of the broad-band picture signal is required to obtain the chance of signal transfer. Further, in the broad-to-narrow converting system presently described too, there may occur a worst case in which a waiting time equal to $T_F$ is required until the signal can be transferred from the main memory 31 to the sub-memory 51. The scanning line period $T_L$ is the unit period of time required for the transfer of the picture signal corresponding to each individual scanning line. Thus, strictly speaking, the waiting time $\tau_W$ must have the relation $\tau_W \geq T_F + T_L$. After the appearance of the signal $L'_2$ from the sub-memory 51, the next line signal $L_3$ is transferred from the main memory 31 to the sub-memory 51 and a signal L'$_3$ appears from the sub-memory 51. Such operation is repeated $r$ times to complete the conversion of the frame signal F$_1$ into a corresponding narrow-band picture signal F'$_2$. From the conditions above described, one frame period $\tau_F$ of the narrow-band picture signal F'$_2$ is given by $$\tau_F = rT_L + (r-1)\tau_W \geq (\alpha + r)T_F - T_L \quad (1)$$

When, for example, the number of scanning lines $r$ is 500 and the band conversion ratio $\alpha^{-1} = 1/300$, $\tau_F$ is approximately equal to 800 $T_F$.

The operation of a narrow-to-broad converting system shown in FIG. 2 is entirely reverse to that of the broad-to-narrow converting system shown in FIG. 1. Referring to FIG. 2, a narrow-band picture signal 621 arriving at an input terminal 72 must be the same as the signal 611 appearing at the output terminal 71 of the system shown in FIG. 1. When the picture signal L'$_1$ corresponding to the first scanning line in the narrow-band picture signal F'$_1$ obtained by the broad-to-narrow coonversion in the converting system shown in FIG. 1 arrives at the input terminal 72, a switch 62 is closed to write the signal L'$_1$ in a sub-memory 52. This sub-memory 52 is a scanning line-memory having the same function as the sub-memory 51 in FIG. 1. Upon completion of writing of the signal L'$_1$ in the sub-memory 52, a switch 42 is closed and the signal L'$_1$ is read out at a high speed determined by the band conversion ratio. The signal L$_1$ thus obtained is transferred from the sub-memory 52 to a main memory 32. This main memory 32 is a broad-band frame memory having the same function as the main memory 31 shown in FIG. 1. Due to the fact that the writing timing for the individual scanning lines constituting one frame of the broad-band picture signal is previously alloted, the signal L$_1$ corresponding to the first scanning line must be transferred from the sub-memory 52 to the main memory 32 through the switch 42 at the specified timing. After the transfer of the line signal L$_1$ to the main memory 32, the picture signal L'$_2$ corresponding to the next scanning line arrives at the input terminal 72 to be written in the sub-memory 52. The signal L$_2$ appears then from the sub-memory 52 to be transferred from the sub-memory 52 to the main memory 32 at the timing specified therefor. Repetition of this manner of operation results in successive storage of the line signals L$_1$, L$_2$, L$_3$, . . . in the main memory 32, and repetition of the above operation $r$ times completes writing of all the picture signals corresponding to one frame in the main memory 32. A broad-band picture signal 121 consisting of a series of broad-band frame signals F$_1$ repeated with the frame period can then be read out from the main memory 32 to be sent out to the exterior through a switch 22 and an output terminal 12. Due to the fact that the narrow-band picture signal 621 consists of line signals spaced apart from each other by the waiting time $\tau_W$ as above described, these line signals can be successively transferred from the sub-memory 52 to the main memory 32 with the exact timing alloted therefor.

In the broad-to-narrow converting system and narrow-to-broad converting system each including one main memory and one sub-memory, a waiting time must be provided between the narrow-band picture signals corresponding to the individual scanning lines in order that such signals can be reliably transferred between the main memory and the sub-memory. In the illustrated example, the period of time required for the transfer of the narrow-band frame signal is about 800 times that of the broad-band frame signal and the maximum frequency of the broad-to-narrow converted signal is 1/300 of that of the broad-band signal when the number of scanning lines $r = 500$ and the band conversion ratio $\alpha^{-1} = 1/300$.

A method may be employed in which a plurality of sub-memories may be used in order to eliminate wasteful time during signal transfer and ensure efficient signal transfer. This method comprises storing a broad-band picture signal or frame signal corresponding to one frame in a main memory in a broad-to-narrow converting system, reading out picture signals or line signals corresponding to individual scanning lines according to the order of the scanning lines, successively distributing and transferring to these line signals to a plurality of sub-memories, reading out the successive line signals at a low speed without any time intervals between these signals, arranging these line signals in series to obtain a narrow-band picture signal or frame signal, transmitting this narrow-band frame signal to a narrow-to-broad converting system, distributing and storing the picture signals or line signals corresponding to the individual scanning lines in a plurality of sub-memories, and transferring these line signals successively to a main memory at a high speed with predetermined timing alloted for these signals. In this case, the minimum required number $m$ of the sub-memories is determined in relation to $r$ and $\alpha$ as will be described later. According to this method, there is no need for maintaining the synchronous relation between the broad-band picture signal and the narrow-band picture signal and these two signals can be dealt with entirely independently of each other.

Figure 4:
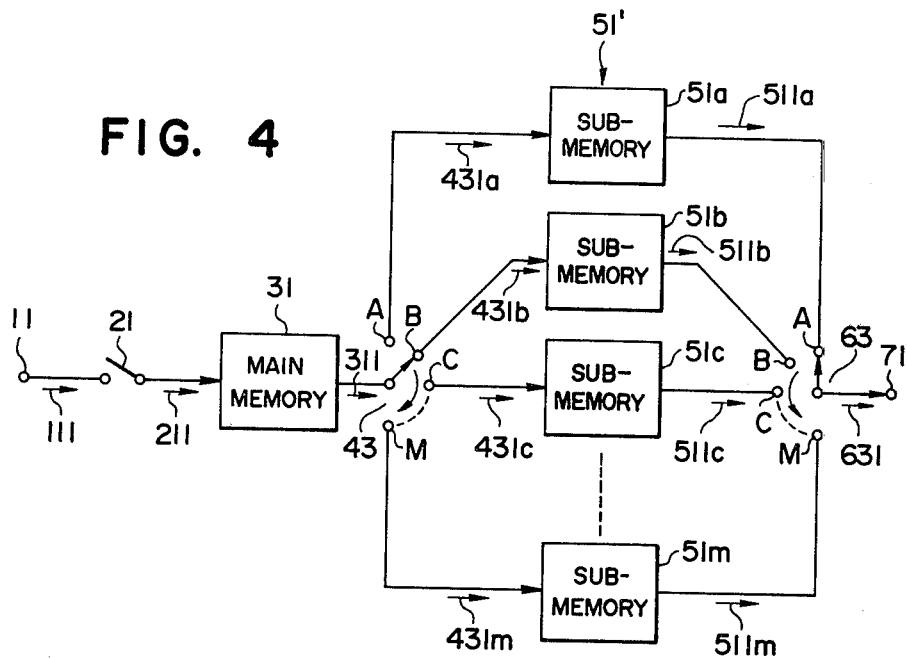
FIG. 4 is a schematic block diagram showing an embodiment of the present invention including a plurality of sub-memories arranged in parallel for converting a broad-band signal into a narrow-band signal.
Figure 5:
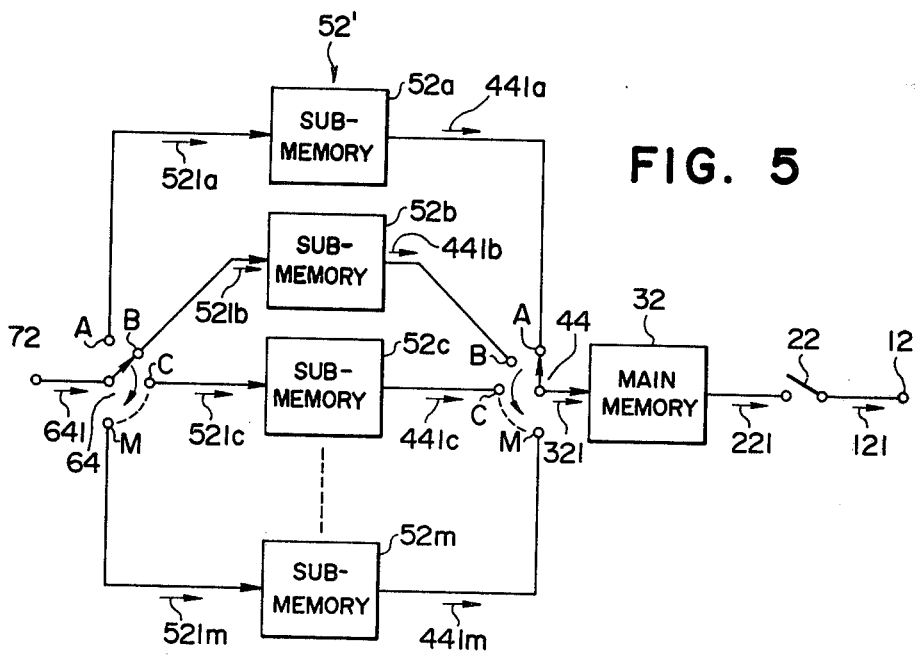
FIG. 5 is a schematic block diagram showing an embodiment of the present invention including a plurality of sub-memories arranged in parallel for converting a narrow-band signal into a broad-band signal.
Figure 6:
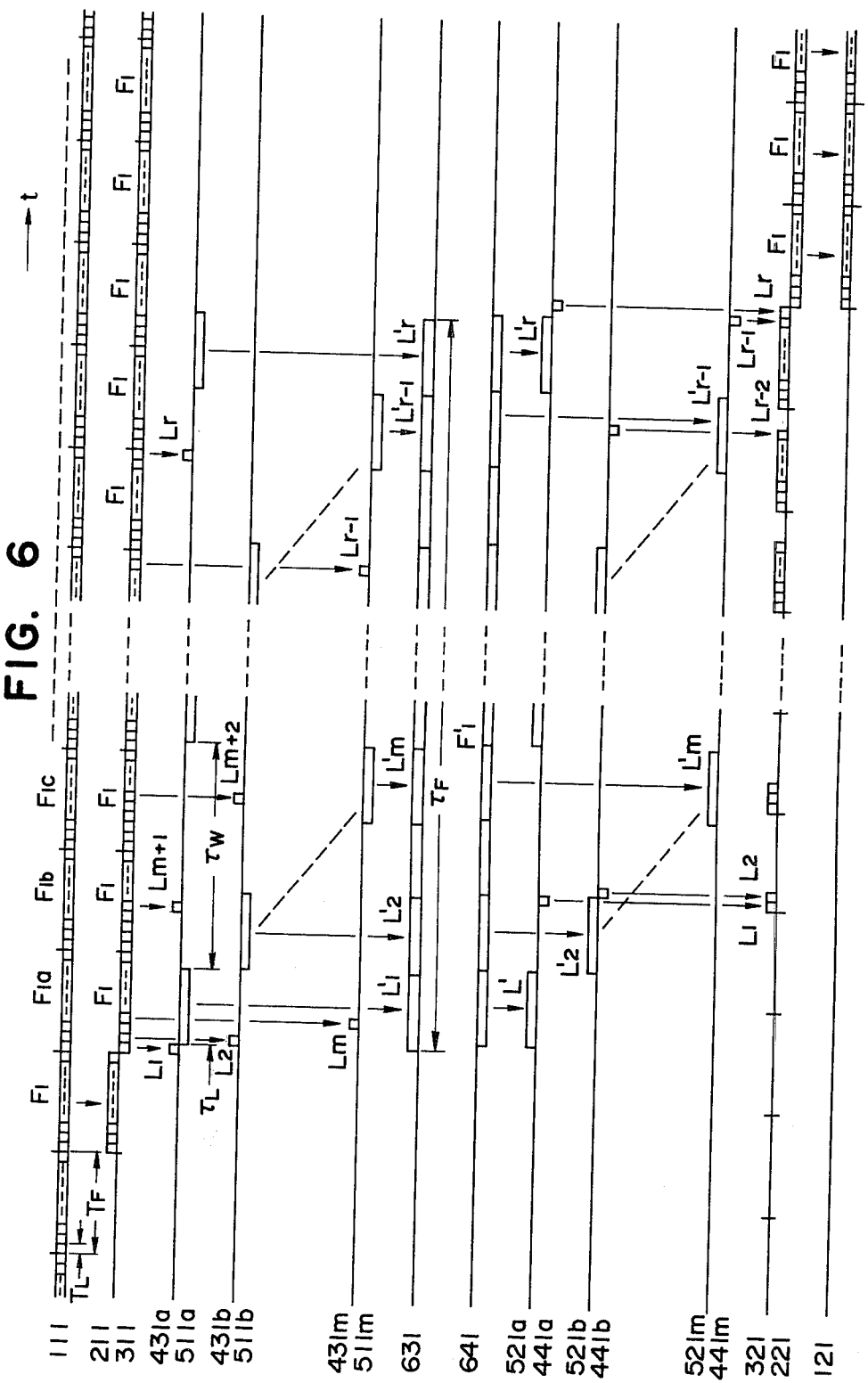
FIG. 6 is a timing chart for illustrating the operation of the embodiments shown in FIGS. 4 and 5.

FIGS. 4 and 5 are schematic block diagrams of a broad-to-narrow converting system and a narrow-to-broad converting system respectively each including one main memory and $m$ sub-memories based on the above method, and FIG. 6 is a timing chart for illustrating the operation of these systems.

Main memories 31 and 32 are broad-band frame memories having a capacity of storing a picture signal or frame signal corresponding to one frame like those described previously. The reference numerals 51' and 52' designate groups of sub-memories. Each sub-memory is a scanning line memory like those described previously. The sub-memory has a capacity of storing a picture signal or line signal corresponding to one scanning line and such signal can be written therein at any desired speed and read out therefrom at any desired speed. As shown in FIG. 6, a broad-band picture signal 111 consists of a series of picture signals or frame signals F$_1$, F$_{1a}$, F$_{1b}$, . . . F$_2$, F$_{2a}$, F$_{2b}$, . . . corresponding to different frames, and each frame signal is composed of picture signals or line signals L$_1$, L$_2$, . . . L$_r$ separated by $r$ scanning lines. A narrow-band picture signal 631 consists of a series of different frame signal groups F'$_1$, F'$_2$, ..... suitably spaced from each other, and each group corresponding to one frame is composed of picture signals or line signals L'$_1$, L'$_2$, . . . L'$_r$ separated by $r$ scanning lines.

Referring first to FIG. 4, the operation of the broad-to-narrow converting system will be described. When the frame signal F$_1$ corresponding to the frame to be subjected to conversion in the broad-band picture signal 111 arrives at an input terminal 11, a switch 21 is closed for the corresponding period of time and this signal F$_1$ is written in the main memory 31 as shown by 211 in FIG. 6. Upon completion of writing, a signal 311 is read out from the main memory 31. This signal 311 includes a series of the signals $F_1$ repeated with the period $T_F$ of one frame of the broad-band picture signal 111. A plurality of sub-memories 51a, 51b, 51c, . . . 51m are connected to the main memory 31 through a sub-memory write switch 43 which has a plurality of contacts A, B, C, . . . M connected to the respective sub-memories 51a, 51b, 51c, . . . 51m. The movable contact of the switch 43 is brought into contact with the contacts A, B, C, . . . M in this order in an endless fashion. When the line signal $L_1$ appears at the output terminal of the main memory 31, the movable contact of the switch 43 is in contact with the contact A and the signal $L_1$ is written in the sub-memory 51a, that is, the signal $L_1$ is transferred from the main memory 31 to the sub-memory 51a. Similarly, the next line signal $L_2$ is transferred from the main memory 31 to the sub-memory 51b through the switch 43 which is now in the position B, and this transfer operation proceeds until the line signal $L_m$ is transferred from the main memory 31 to the submemory 51m.

These line signals $L_1$ to $L_m$ are read out from the respective sub-memories 51a to 51m according to the order with which they are transferred. Upon completion of writing of the signal $L_1$ in the sub-memory 51a, read-out of this signal from the sub-memory 51a is started immediately. This read-out is carried out at a low speed which is determined by the band conversion ratio $\alpha^{-1} = T_L/\tau_L$, where $T_L$ is similarly the period of one scanning line in the broad-band picture signal and $\tau_L$ is the period of one scanning line in a narrow-band picture signal described later. A sub-memory read switch 63 having m contacts A to M similar to the switch 43 is disposed between the sub-memories 51a to 51m and an output terminal 71. A signal $L'_1$ is read out from the sub-memory 51a and is applied to the output terminal 71 through the contact A of the switch 63 to be sent out to the exterior as a part of a narrow-band picture signal 631 as shown in FIG. 6. Immediately after the read-out of the signal $L'_1$ from the sub-memory 51a, read-out of a succeeding signal $L'_2$ from the sub-memory 51b is started and this signal $L'_2$ is applied to the output terminal 71 through the contact B of the switch 63. The read-out operation proceeds in this manner.

Writing of the succeeding line signals in the sub-memory group 51' is carried out after read-out from the individual sub-memories has ended. More precisely, after the read-out of the signal $L'_1$ from the sub-memory 51a, the next line signal $L_{m+1}$ is read out from the main memory 31 and is transferred from the main memory 31 to the sub-memory 51a through the contact A of the switch 43 at predetermined timing. Similarly, after the read-out of the signal $L'_2$ from the sub-memory 51b, the next line signal $L_{m+2}$ is read out from the main memory 31 to be transferred to the sub-memory 51b through the contact B of the switch 43. This manner of signal transfer from the main memory 31 to the sub-memory group 51' and signal read-out from the sub-memory group 51' proceed continuously until all the line signals corresponding to the scanning lines constituting the specific frame are transferred to be read out. In this manner, the broad-to-narrow conversion of the picture signal is completed to provide a narrow-band picture signal $F'_1$. This narrow-band picture signal $F'_1$ is composed of a series of line signals $L'_1, L'_2, \ldots L'_n$ corresponding to the scanning lines constituting the frame. Since there are no time intervals between these line signals, one frame period $\tau_F$ of this signal $F'_1$ is given by $$\tau_F = r\tau_L = \alpha T_F \qquad (\ )$$

The number $m$ of the sub-memories required for eliminating wasteful time is determined in a manner as described below. The waiting time $\tau_W$ for each individual sub-memory which waits for the transfer of the specific line signal from the main memory must be equal to $(T_F + T_L)$ at the least. Thus, the relation $\tau_W = (m-1)\tau_L \geq T_F + T_L$ holds, and from this relation, $m$ is given by $$m \geq 1 + \frac{r+1}{\alpha} \qquad (3)$$

When the result of calculation of the above formula by putting the numerical values of $r$ and $\alpha$ therein gives a fraction, such fraction is counted as one and the natural number thus obtained is employed as the value of $m$. Thus, when $r = 500$ and $\alpha = 300$, $m \geq 2.67$ is obtained from the formula (3) and three sub-memories may be employed.

The operation of the narrow-to-broad converting system will next be described with reference to FIG. 5. Referring to FIG. 5, a sub-memory write switch 64 having m contacts A, B, . . . M similar to the switch 43 is connected between an input terminal 72 and a sub-memory group 52' consisting of m sub-memories 52a, 52b, 52c, . . . 52m, and a sub-memory read switch 44 having $m$ contacts A, B, . . . M similar to the switch 63 is connected between the sub-memory group 52' and a main memory 32. It is assumed for convenience of description that a narrow-band picture signal 641 arriving at the input terminal 72 is the same as the signal 631 delivered from the broad-to-narrow converting system shown in FIG. 4. Actually, however, the latter signal 631 is transmitted to the input terminal 72 by way of a narrow-band transmission path. When this signal 641 is the narrow-band frame signal $F'_1$ corresponding to the specific frame and such signal arrives at the input terminal 72, the line signals $L'$ corresponding to the individual scanning lines in the signal $F'_1$ are successively distributed to be written in the individual sub-memories 52a to 52m constituting the sub-memory group 52'. More precisely, the first line signal $L'_1$ is written in the sub-memory 52a, the next line signal $L'_2$ in the sub-memory 52b, the line signal $L'_m$ in the sub-memory 52m, the line signal $L'_{m+1}$ in the sub-memory 52a, and so on. In this manner, these line signals are successively written in the sub-memories in an endless fashion. The line signals thus written in the sub-memories 52a to 52m are then successively read out at a high speed determined by the band conversion ratio $\alpha^{-1} = T_L/\tau_L$ to be successively transferred to the main memory 32 through the switch 44. These signals are transferred to the main memory 32 with predetermined timing according to the order of the scanning lines, and the transfer occurs successively with such timing from the sub-memories having the signals written therein. More precisely, during the period of time in which the signal $L'_{m+1}$ is written in the sub-memory 52a after previous writing of the first signal $L'_1$ therein, the line signal $L_1$ is read out from the sub-memory 52a at the timing specified therefor to be transferred from the sub-memory 52a to the main memory 32 through the contact A of the switch 44. Writing of the signals in the sub-memory group 52' and transfer of the signals from the sub-memory group 52' to the main memory 32 proceed continuously until all the line signals corresponding to the scanning lines constituting the specific frame have been written and transferred. When the entire frame signal corresponding to the specific frame is stored in the main memory 32, the narrow-to-broad conversion of the narrowband picture signal $F'_1$ is completed, and a series of the frame signals $F_1$, $F_1$, . . . repeated in an endless fashion with the frame period $T_F$ of the broad-band picture signal are read out from the main memory 32. The output 221 of the main memory 32 is transmitted through a switch 22 to be sent out to the exterior from an output terminal 12 as a broad-band picture signal 121. The minimum waiting time $\tau_W$ for having the chance of transferring the line signal L from one of the sub-memories to the main memory 32 is $\tau_W = T_F + T_L$. Thus, the minimum number $m$ of sub-memories required for reliably transferring the line signals L from all the sub-memories to the main memory 32 is also determined by the formula (3) as in the case of the broad-to- narrow converting system.

It is known from the formula (3) that two sub-memories are required when $r + 1 < \alpha$. In this case, a band converting system comprising a series arrangement of sub-memories may be employed in lieu of the converting system comprising the parallel arrangement above described.

Figure 7:
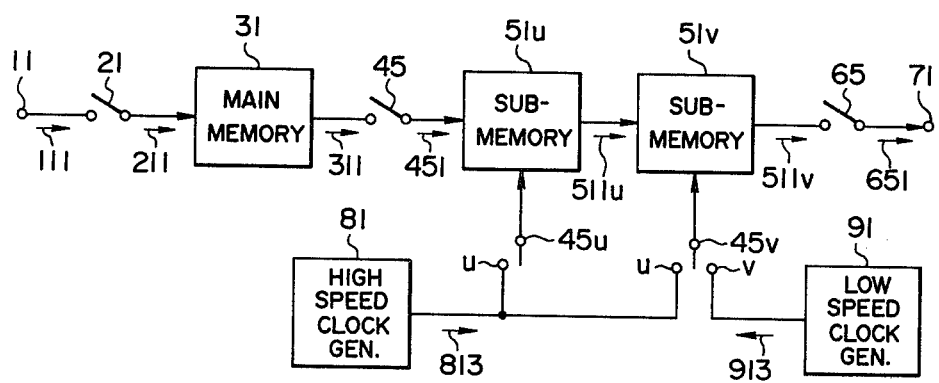
FIG. 7 is a schematic block diagram of another embodiment of the present invention including a pair of sub-memories arranged in series for converting a broad-band signal into a narrow-band signal.
Figure 8:
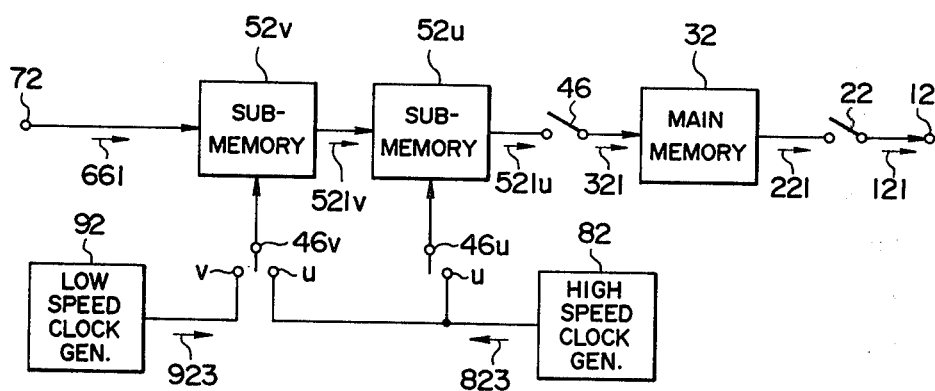
FIG. 8 is a schematic block diagram of another embodiment of the present invention including a pair of sub-memories arranged in series for converting a narrow-band signal into a broad-band signal.
Figure 9:
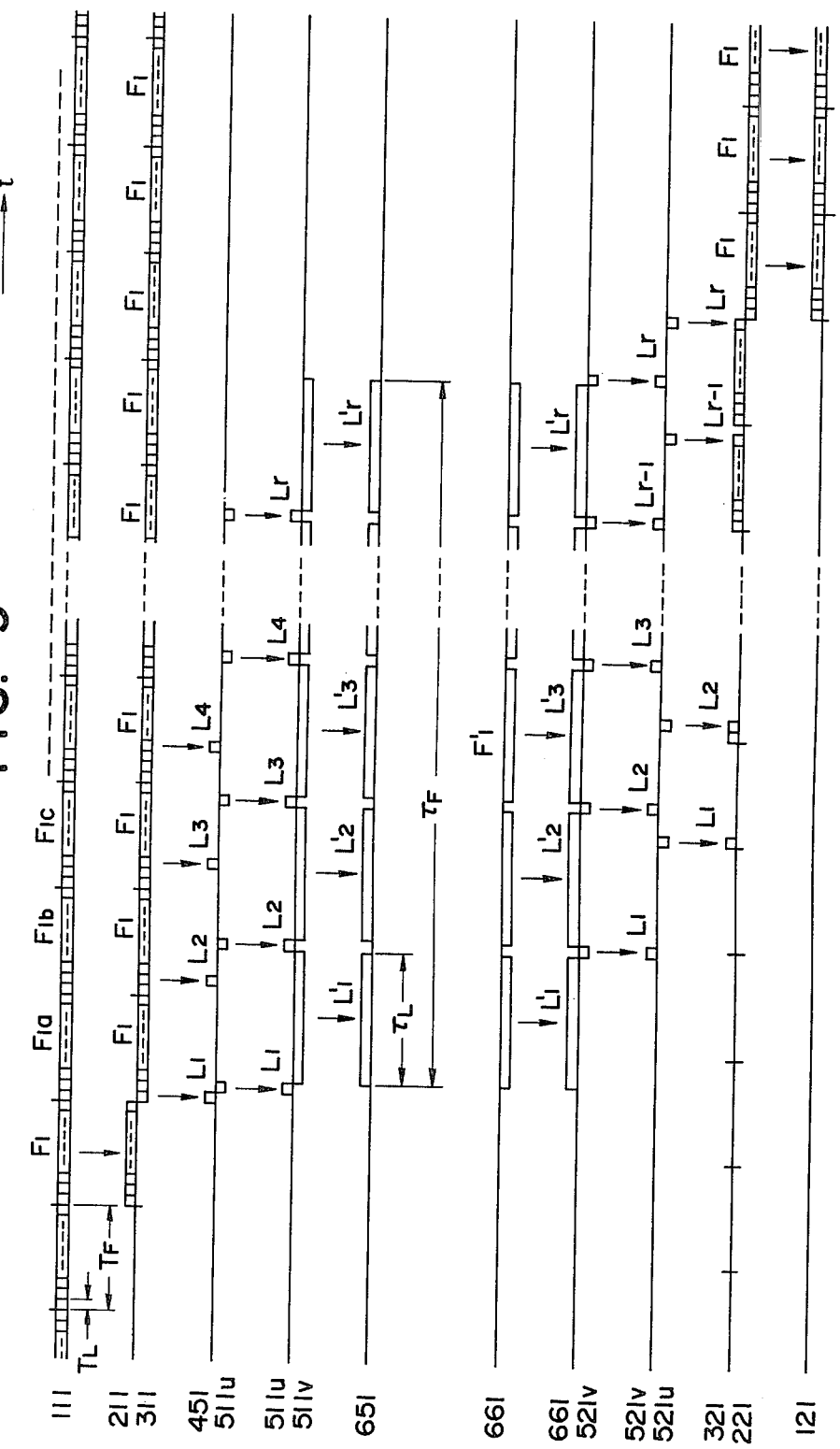
FIG. 9 is a timing chart for illustrating the operation of the embodiments shown in FIGS. 7 and 8.

FIGS. 7 and 8 are schematic block diagrams of a broad-to-narrow converting system and a narrow-to-broad converting system respectively each including two sub-memories arranged in series, and FIG. 9 is a timing chart for illustrating the operation of these systems. Main memories 31 and 32 are broad-band frame memories having a function similar to that described previously. Sub-memories 51u, 51v, 52u and 52v are scanning line memories having a function similar to that described previously. High-speed clock pulse generators 81 and 82 generate high-speed clock pulse signals 813 and 823 for decomposing a broad-band picture signal into picture elements for writing same in or reading out same from the sub-memories. Low-speed clock pulse generators 91 and 92 generate low-speed clock pulse signals 913 and 923 for decomposing a narrow-band picture signal into picture elements for writing same in or reading out same from the sub-memories. The ratio between the frequencies of the high-speed and low-speed clock pulse signals is determined by the band conversion ratio $\alpha^{-1} = T_L/\tau_L$.

The operation of the broad-to-narrow converting system will now be described with reference to FIG. 7. A broad-band picture signal or frame signal $F_1$ corresponding to one frame is stored in the main memory 31 to be subjected to conversion. This signal $F_1$ is read out from the main memory 31 and the output 311 of the main memory 31 includes a series of the frame signals $F_1$ repeated with the frame period $T_F$. The output 311 is divided into line signals L corresponding to individual scanning lines, and these signals L are successively transferred to the sub-memory 51u, thence to the sub-memory 51v according to the order of the scanning lines to be read out at a low speed determined by the band conversion ratio $\alpha^{-1} = T_L/\tau_L$ so as to obtain a narrow-band picture signal 651 at an output terminal 71. The sub-memory 51u acts to regulate the read-out timing of the signals L successively read out from the main memory 31 and to regulate the read-out timing of the signals from the sub-memory 51v from which the signals L are delivered to provide the narrow-band picture signal 651.

The operation of this converting system will be described in more detail with reference to FIG. 9. When the line signal $L_1$ corresponding to the first scanning line is read out from the main memory 31, a switch 45 is closed and a switch 45u is connected to a contact U during this period of time $T_L$ for applying the line signal $L_1$ and clock pulse signal 813 to the sub-memory 51u. Thus, the line signal $L_1$ can be transferred from the main memory 31 to the sub-memory 51u. Immediately after the transfer of the line signal $L_1$, the switch 45u is connected to the contact U again and a switch 45v is connected to another contact U for a period of time $T_L$ so as to read out the signal $L_1$ from the sub-memory 51u and write the output 511u or signal $L_1$ of the sub-memory 51u in the sub-memory 51v. Upon completion of the above operation, the switch 45v is now connected to a contact V and a switch 65 is closed for a period of time $\tau_L$ so as to read out the signal $L_1$ stored in the sub-memory 51v at a low speed thereby obtaining a narrow-band line signal $L'_1$ corresponding to the specific scanning line. Thus, the narrow-band picture signal 651 appears at the output terminal 71.

In the systems shown in FIGS. 7 and 8, $r + 1 < \alpha$ as described previously. Thus, the next line signal $L_2$ can be read out at least once from the main memory 31 during the period of time in which the line signal $L'_1$ is read out from the sub-memory 51v. During this period of time, the switch 45 is closed and the switch 45u is connected to the contact U so as to transfer the line signal $L_2$ from the main memory 31 to the sub-memory 51u. Upon completion of read-out of the line signal $L'_1$ from the sub-memory 51v, the switch 45u is connected to the contact U and the switch 45v is connected to the contact U for a period of time $T_L$ so as to transfer the line signal $L_2$ from the sub-memory 51u to the sub-memory 51v. Upon completion of the transfer of the line signal $L_2$, the switch 45v is connected to the contact V and the switch 65 is closed for a period of time $\tau_L$ so as to read out a line signal $L'_2$ from the sub-memory 51v and transmit this signal $L'_2$ to the output terminal 71. Repetition of the above manner of operation $r$ times completes broad-to-narrow conversion of the broad-band frame signal $F_1$ corresponding to the specific frame and a corresponding narrow-band picture signal $F'_1$ can be obtained. In the narrow-band picture signal $F'_1$ thus obtained, one frame period $\tau_F$ includes wasteful time intervals approximately equal to $T_L$ between the adjacent line signals. However, this wasteful time is not so appreciable as will be apparent from the following formula:

$$\tau_F \geq (\alpha + 1)T_F - T_L \tag{4}$$

It will be seen from comparison between the formulas (2) and (4) that the wasteful time is approximately equal to $T_F$.

Generally, in a stationary memory, a signal is not written therein unless a clock pulse is applied thereto. Therefore, the switch 45 is not necessarily required, but such switch is provided in FIG. 7 for convenience of description. The series arrangement of sub-memories is advantageous over the parallel arrangement in that the number of switches in the picture signal transfer system can be decreased.

The operation of the narrow-to-broad converting system will be described with reference to FIGS. 8 and 9. A narrow-band picture signal 661 arriving at an input terminal 72 to be subjected to conversion is similar to the signal 651 described with reference to FIGS. 7 and 9, and it is supposed that the signal 661 is the signal $F'_1$ appearing from the broad-to-narrow converting system shown in FIG. 7. When the first line signal $L'_1$ in this frame signal $F'_1$ arrives at the input terminal 72, a switch 46v is connected to a contact V for a period of time $\tau_L$ for applying the low-speed clock pulse signal 923 to the sub-memory 52v so as to write this signal $L'_1$ in the sub-memory 52v. Upon completion of writing, the switch 46v is connected to a contact U and a switch 46u is connected to a contact U for a period of time $T_L$ for applying the high-speed clock pulse signal 823 to the sub-memories 52v and 52u so as to read out a signal 521v or signal $L_1$ from the submemory 52 v at a high speed and transfer this signal to the sub-memory 52u. Upon completion of transfer, the switch 46v is connected to the contact V again for a period of time $\tau_L$ so as to write the next line signal $L'_2$ in the sub-memory 52v. When the time slot previously specified for writing the signal $L_1$ in the main memory 32 is reached, the switch 46u is connected to the contact U for a period of time $T_L$ so as to apply the high-speed clock pulse signal 823 to the sub-memory 52u for reading out the signal $L_1$ stored therein, and at the same time, the switch 46 is closed so as to transfer this signal to the main memory 32. Failure of this signal transfer does not occur since the chance of transferring this signal $L_1$ exists necessarily within the period of time $\tau_L$ during which the signal $L'_2$ is written in the sub-memory 52v.

Upon completion of writing of the signal $L'_2$ in the sub-memory 52v, the switch 46v is connected to the contact U and the switch 46u to the contact U again for a period of time $T_L$ so as to transfer the signal $L_2$ stored in the sub-memory 52v from this sub-memory 52v to the sub-memory 52u. After the transfer of the signal $L_2$, the next line signal $L'_3$ is similarly written in the sub-memory 52v, and during this period of time, the signal $L_2$ stored in the sub-memory 52u is transferred to the main memory 32. Thus, the sub-memory 52u acts to regulate the timing of the line signals $L'$ in the narrow-band picture signal $F'_1$ arriving at the input terminal 72 and to regulate the timing of writing the line signals $L$ in the main memory 32. Repetition of the above manner of operation r times completes narrow-to-broad conversion of the line signals $L'$ in the narrow-band picture signal $F'_1$, and the converted line signals are successively stored in the main memory 32 according to the order of the scanning lines until the main memory 32 is filled with all the line signals constituting the specific frame. A switch 22 is then closed so as to apply to the output terminal 12 a complete broad-band picture signal 121 in which the signal $F_1$ read out from the main memory 32 is repeated with the period $T_F$.

In the foregoing description, a parallel arrangement of a plurality of sub-memories and a series arrangement of a pair of sub-memories have been briefly described to illustrate preferred forms of the picture signal band converting system according to the present invention. Practical circuit diagrams of these arrangements will be described hereunder.

Figure 10:
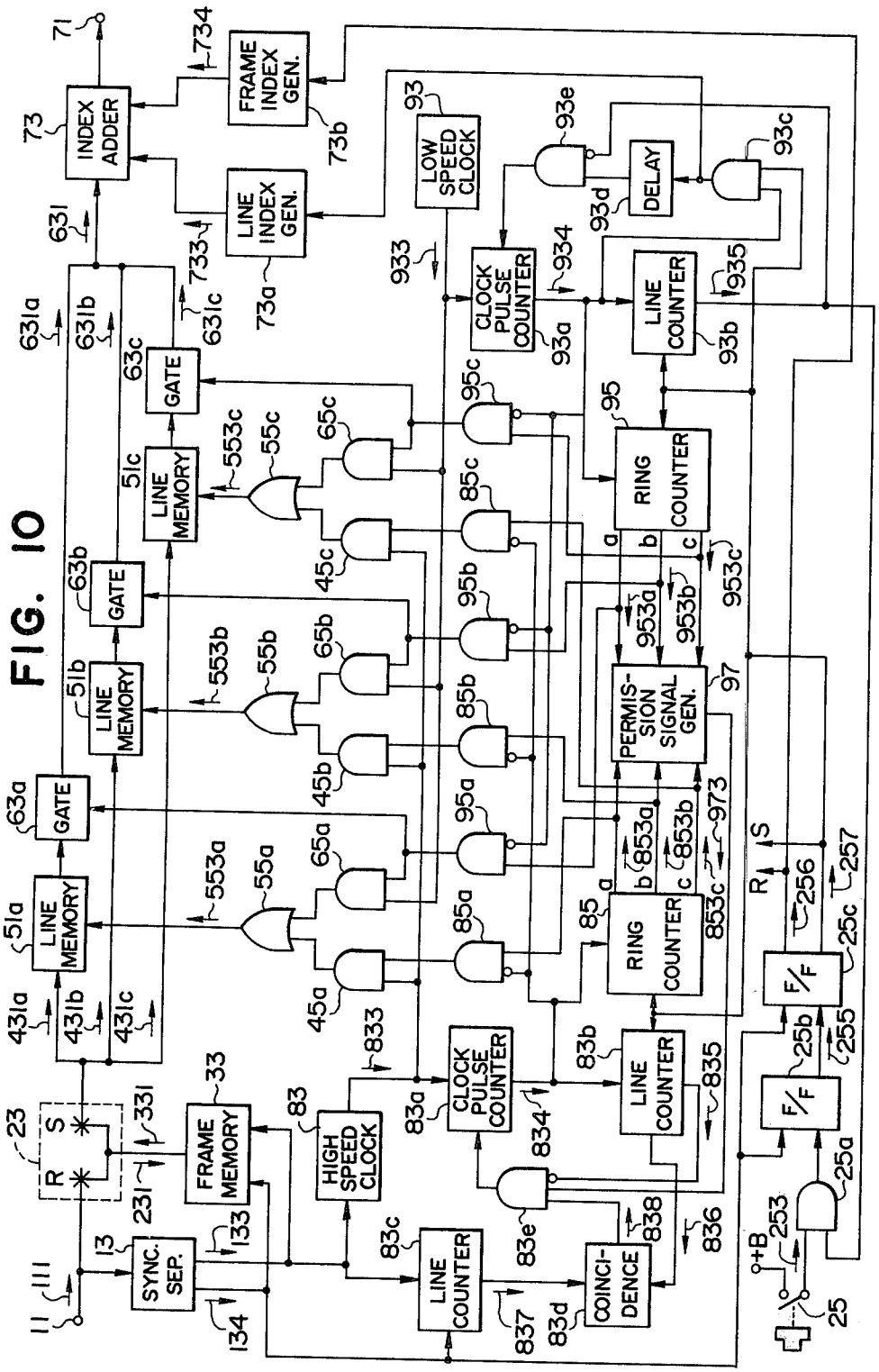
FIG. 10 is a detailed block diagram of another embodiment of the present invention including a plurality of sub-memories arranged in parallel for converting a broad-band signal into a narrow-band signal.

FIG. 10 is a detailed block diagram of an embodiment of the broad-to-narrow converting system of the present invention which includes three sub-memories arranged in parallel. Referring to FIG. 10, a composite broad-band picture signal 111 is applied through an input terminal 11 to a synchronizing signal separator 13 which separates a scanning line synchronizing signal 133 and a frame synchronizing signal 134 from the input 111 and shapes such signals. A write-read change-over switch 23 for a main memory 33 is changed over to the position R when a control signal 256 applied from a system control section is 1 and to the position S when another control signal 257 applied from the system control section is 1. This system control section is composed of a conversion instruction switch 25, an AND gate 25a, and a pair of flip-flops 25b and 25c. The broad-band frame memory 33 has a capacity of storing a picture signal or frame signal corresponding to one frame and may be a magnetic disk which can record one frame of a television signal. The frame memory 33 stores an input signal 231 in response to the application of such signal, and an output signal 331 appears from the frame memory 33 in response to the disappearance of the input. Further, the operation of this frame memory 33 is controlled by the synchronizing signals applied from the synchronizing signal separator 13 so that the phase of each line signal stored therein can be alloted depending on the phase of the line synchronizing signal. Sub-memories 51a, 51b and 51c are scanning line memories each of which has a capacity of storing p picture elements in the effective picture signal portion of each individual line signal. These sub-memories 51a to 51c are driven by respective clock pulse signals 553a to 553c applied through OR gates 55a to 55c and AND gates 65a to 65c and 45a to 45c so that such line signals can be written therein or read out therefrom. Read signal gates 63a to 63c are connected to the output of the respective sub-memories 51a to 51c. An index signal adder 73 is connected to a line index signal generator 73a and frame index signal generator 73b so as to add index signals 733 and 734 generated by these generators 73a and 73b to a narrow-band picture signal 631.

A high-speed clock pulse generator 83 is driven by the output signal 133 of the synchronizing signal separator 13 to generate a clock pulse signal 833 whose frequency is p cycles per effective period $T_L$ of the scanning line and is a multiple of the scanning line frequency. A low-speed clock pulse generator 93 generates a clock pulse signal 933 such that the frequency ratio between the signals 833 and 933 is determined by the band conversion ratio $\alpha^{-1} = T_L/\tau_L$. Clock pulse counters 83a and 93a deliver output signals 1 or carries 834 and 934 respectively when they count p pulses. Scanning line counters 83b, 83c and 93b deliver output signals 1 or carries 835, 837 and 935 respectively when they count n effective scanning lines constituting one frame. A scanning line order coincidence pulse generator 83d generates an output signal 1 or coincidence signal 838 when the counts of the scanning line counters 83b and 83c coincide with each other. A pulse delay means 93d has a delay time $\tau_p$ which has the relation $\tau_p \geq T_L$. Three-phase ring counters 85 and 95 count the output signals 834 and 934 of the clock pulse counters 83a and 93a respectively and 1 appears in an endless fashion at outputs a, b and c in that order. These ring counters 85 and 95 are reset by the signal 257 applied from the flip-flop 25c and 1 appears at the output a. A write permission signal generator 97 generates an output signal 973. This output signal 973 is 1 when the count of the ring counter 85 is advanced by less than two steps compared with that of the ring counter 95 thereby premitting writing of the signals in the sub-memories. This output signal 973 is 0 when the count of the ring counter 85 is advanced by two steps compared with that of the ring counter 95, thereby inhibiting the subsequent writing operation. Therefore, the next signal would not be written in each individual sub-memory until the preceding signal written therein is completely read out. The converting system further includes an AND gate 93c and INHIBIT gates 83e, 93e, 85a to 85c and 95a to 95c as shown.

Figure 12:
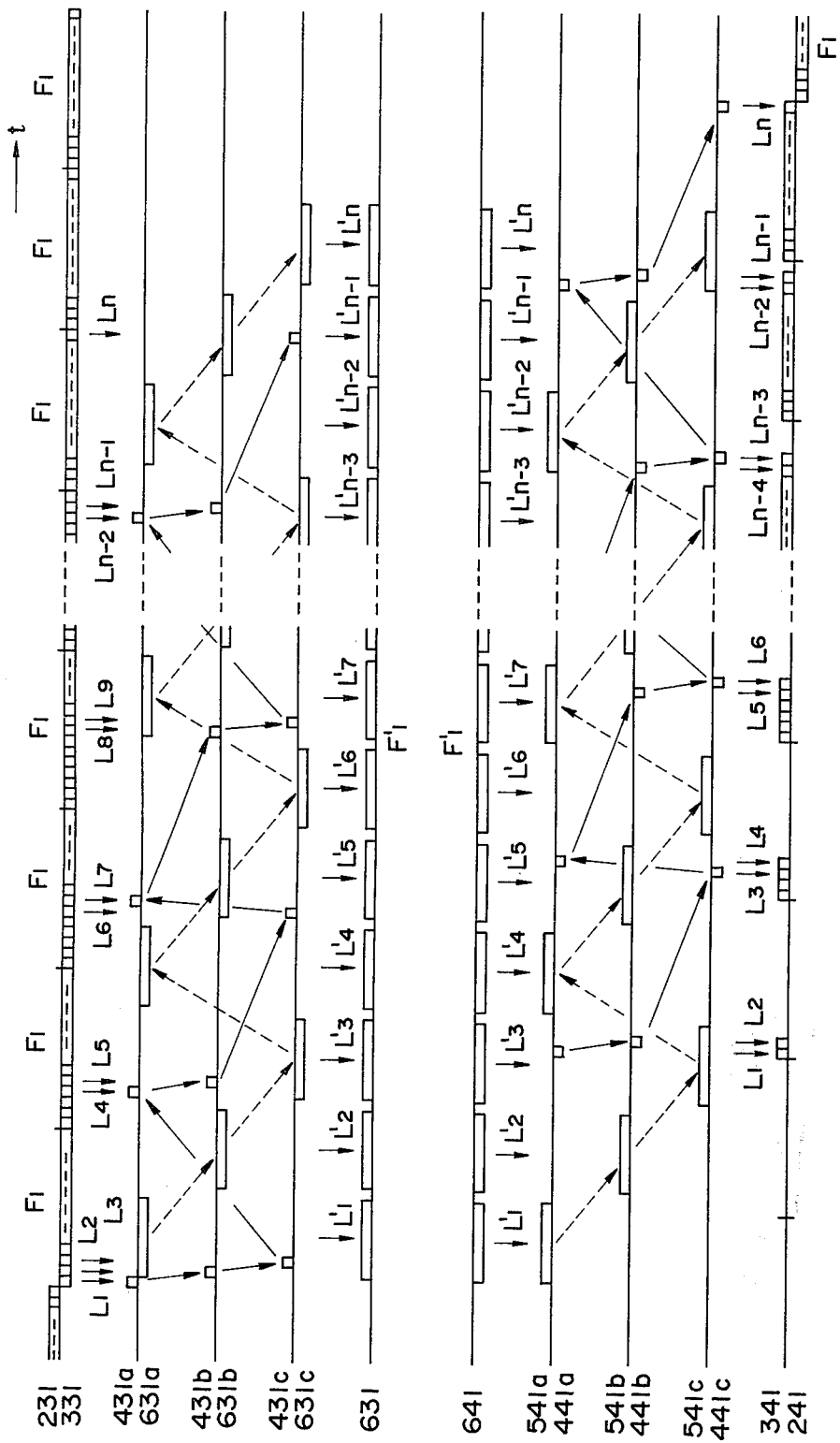
FIGS. 12 and 13 are timing charts for illustrating the operation of the embodiments shown in FIGS. 10 and 11.
Figure 13:
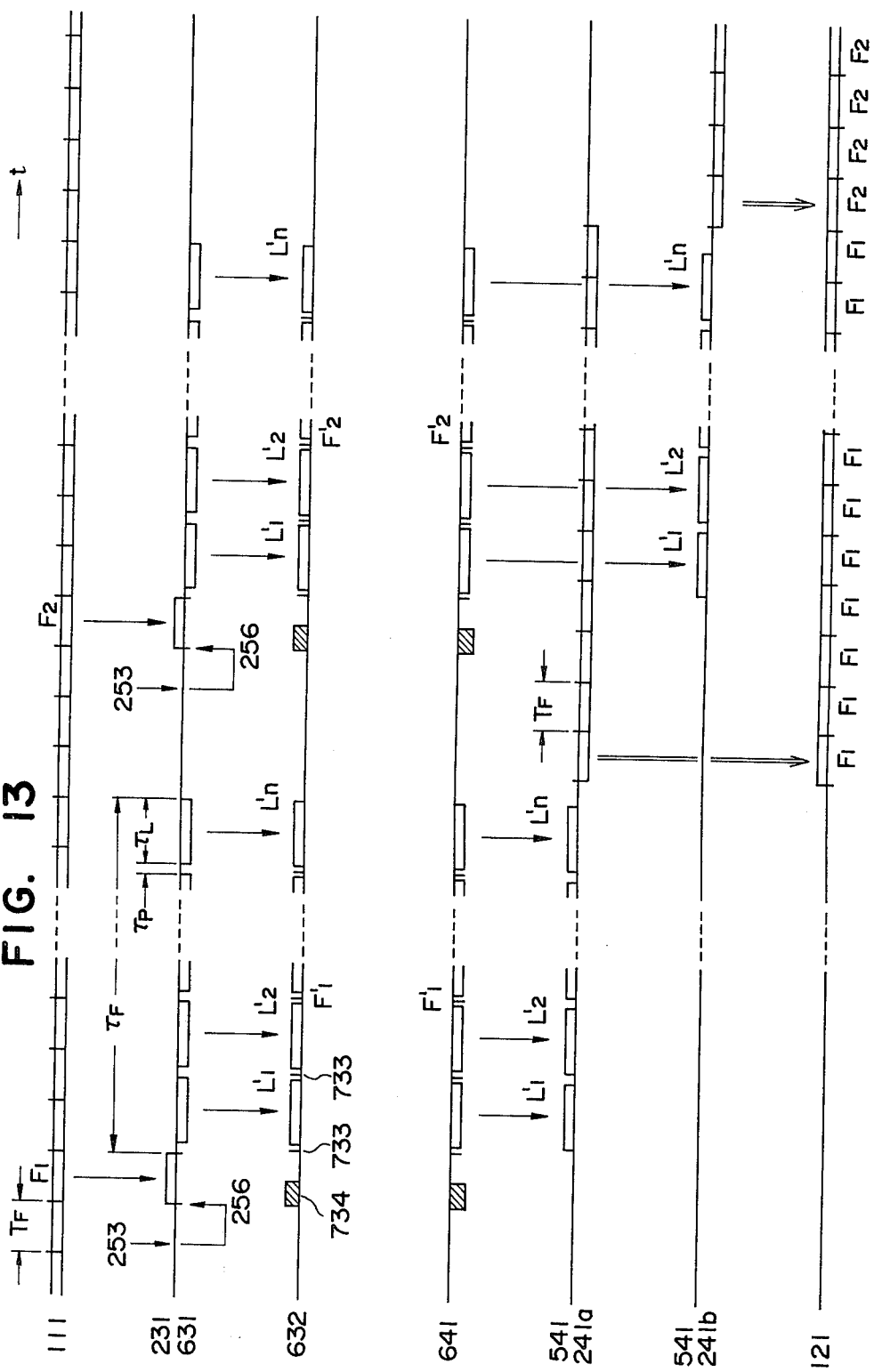

The operation of the converting system shown in FIG. 10 will now be described with reference to timing charts shown in FIGS. 12 and 13. When a broad-band picture signal or frame signal $F_1$ corresponding to the frame to be subjected to conversion arrives at the input terminal 11, the conversion instruction switch 25 is depressed to produce a conversion instruction signal 253, and as a result, the system control section composed of the AND gate 25a and flip-flops 25b and 25c produces a main memory write signal 256 which takes the state 1 during one frame period $T_F$ only.

This signal 256 is produced in a manner as described below. The frame synchronizing signal 134 is continuously applied to the reset terminals of the flip-flops 25b and 25c, and normally, the output signal 255 of the flip-flop 25b is in the state 1, while one of the output signals 256 of the flip-flop 25c is in the state 0 and the other output signal 257 thereof is in the state 1. In response to the application of the conversion instruction signal 253 to the set terminal of the flip-flop 25b through the AND gate 25a, the output signal 255 of the flip-flop 25b is inverted to the state 0 and is subsequently returned to the state 1 in response to the application of the first pulse of the frame synchronizing signal 134 to the reset terminal of the flip-flop 25b. The variation of this output signal 255 from 0 to 1 is applied to the set terminal of the flip-flop 25c with the result that the output signal 256 takes the state 1 and the output signal 257 takes the state 0. This state continues until the next pulse of the frame synchronizing signal 134 is applied to the reset terminal of the flip-flop 25c, and then the original state is restored. Therefore, the signal 256 takes the state 1 during only one frame period $T_F$ in synchronism with the frame period of the picture signal applied to the input terminal 11 when the conversion instruction switch 25 is manipulated. The AND gate 25a is provided so that the system control section may not be actuated even when the conversion instruction switch 25 may be manipulated during the band converting operation.

The signal 256 thus obtained acts to change over the change-over switch 23 to the position R, and as a result, the broad-band frame signal $F_1$ is stored in the main memory 33. After one frame period, the main memory read signal 257 takes the state 1 to change over the write-read change-over switch 23 to the position S so that the frame signal $F_1$ is read out repeatedly with the frame period to appear at the output of the switch 23. When the output signal 257 of the flip-flop 25c changes from 0 to 1, the scanning line counters 83b, 93b and ring counters 85, 95 are reset and broad-to-narrow conversion is started.

When the scanning line counter 83b is reset, the carry 835 takes the state 0. The output signal 973 of the write permission signal generator 97 takes the state 1 when the ring counter 85 and the ring counter 95 are reset. The gate 83e is open by the carry 835 of state 0 and the permission signal 973 of state 1. Since the main memory 33 is driven in synchronism with the line synchronizing signal in the picture signal, the timing of the signal to be read out coincides with the timing of the output signal of the synchronizing signal separator 13. Thus, the line signals can be read out with exact timing on the basis of the line synchronizing signal separated from the picture signal input. The coincidence pulse generator 83d generates the line coincidence pulse signal 838 at the timing of the first line signal $L_1$ stored in the main memory 33, and this signal 838 passes through the gate 83e to reset the clock pulse counter 83a. The carry 834 takes the state 0 and the gates 85a, 85b and 85c are opened. Since the three-phase ring counter 85 is in the reset state, the first phase output 853a thereof is in the state 1, and therefore, the output of the gate 85a is in the state 1. As a result, the AND gate 45a is opened and the high-speed clock pulse signal 833 generated by the clock pulse generator 83 passes through the AND gate 45a and OR gate 55a to drive the sub-memory 51a. Thus, the transfer of the line signal $L_1$ from the main memory 33 to the sub-memory 51a is started. At the same time, the clock pulse counter 83a starts to count the high-speed clock pulses 833, and the carry 834 takes the state 1 when the counter 83a counts $p$ pulses. The gate 85a is closed to interrupt the supply of the high-speed clock pulse signal 833 to the sub-memory 51a, and the transfer of the line signal $L_1$ from the main memory 33 to the sub-memory 51a is completed. In the meantime, the scanning line counter 83b and the three-phase ring counter 85 are advanced by one step by the carry 834 which is the output of the clock pulse counter 83a. At this time, the coincidence pulse generator 83d generates the scanning line order coincidence pulse signal 838 at the timing of the next line signal $L_2$ to reset the clock pulse counter 83a again. The carry 834 of the counter 83a acts to opon the gates 85a, 85b and 85c, and the AND gate 45b is opened due to the fact that the second phase output 853b of the three-phase ring counter 85 takes now the state 1. As a result, the high-speed clock pulse signal 833 passes through the AND gate 45b and OR gate 55b to drive the sub-memory 51b and the transfer of the line signal $L_2$ from the main memory 33 to the sub-memory 51b is started. Similar operation takes place for the transfer of the next line signal $L_3$ to the sub-memory 51c. Upon completion of the transfer of the line signal $L_3$, the three-phase ring counter 85 is advanced by two steps compared with the three-phase ring counter 95. The write permission signal 973 takes the state 0 and the gate 83e is closed. Since the clock pulse counter 83a would not be reset even when the coincidence pulse signal 838 may appear from the coincidence pulse generator 83d, subsequent signal transfer to the sub-memories 51a, 51b and 51c is interrupted. Then, when the signals are read out from the sub-memories 51a to 51c and the three-phase ring counter 95 is advanced by one step, the write permission signal 973 takes the state 1 again to permit signal transfer to the sub-memories from which the preceding signals have been read out. This signal transfer operation from the main memory 33 to the sub-memories 51a to 51c continues until the scanning line counter 83b counts $n$ carries 834 and the carry 835 takes the state 1 to close the gate 83e.

Read-out from the sub-memories 51a to 51c is carried out in a manner as described below. As soon as the read-out from the main memory 33 is started, the scanning line counter 93b is reset by the output signal 257 of the flip-flop 25c in the system control section, and the carry 935 takes the state 0 to open the gate 93e. At this time, the gate 93c is already open since the carry 934 is in the state 1. Thus, the signal 257 passes through the gate 93c and is delayed by $\tau_p$ by the pulse delay means 93d. Then, the signal 257 passes through the gate 93e to reset the clock pulse counter 93a. The carry 934 of the clock pulse counter 93a takes the state 0 and the gates 95a to 95c are opened. However, the three-phase ring counter 95 is also reset by the same signal 257 applied from the flip-flop 25c and the first phase output 953a is solely in the state 1. Finally, 1 appears solely from the gate 95a. Thus, the read signal gate 63a and AND gate 65a are opened so that the low-speed clock pulse signal 933 generated by the clock pulse generator 93 passes through the gate 65a to drive the sub-memory 51a and read-out of the signal $L_1$ from the sub-memory 51a is started. The read-out of the signal $L_1$ is completed when the clock pulse counter 93a counts p low-speed clock pulses 933 and the carry 934 takes the state 1. This carry 934 advances the scanning line counter 93b and three-phase ring counter 95 by one step and passes through the AND gate 93c, pulse delay means 93d and INHIBIT gate 93e to reset the clock pulse counter 93a. The signal $L_2$ is read out from the sub-memory 51b until the counter 93a completes counting of p low-speed clock pulses 933 again. This read-out operation continues until the scanning line counter 93b counts n carries 934 and the carry 935 takes the state 1 to close the gate 93e, thereby completing the broad-to-narrow conversion of the frame signal $F_1$. When the carry 935 takes the state 1, that is, when the conversion is completed, the carry 935 acts to open the AND gate 25a to place the AND gate 25a in which it is ready to receive the next conversion instruction signal.

The delay $\tau_p$ by the pulse delay means 93d is necessary so that the low-speed read-out can be started after the complete transfer of the first line signal $L_1$ from the main memory 33 to the sub-memory 51a and so that the line index signal 733 can be inserted in the gap between the line signals in the narrow-band picture signal. This delay $\tau_p$ is selected to be slightly longer than $T_L$. The line index signal 733 is shaped in the line index signal generator 73a in response to the output of the AND gate 93c and is applied to the index signal adder 73 to be added to the narrow-band picture signal 631. The frame index signal 734 is shaped in the frame index signal generator 73b in response to the signal 256 delivered from the flip-flop 25c and is also applied to the index signal adder 73 to be added to the narrow-band picture signal 631. In this manner, a composite narrow-band picture signal 632 is obtained and is sent out to the exterior from an output terminal 71. The sub-memory write permission signal generator 97 can be easily obtained by the logic circuit designing technique so that the output signal 973 takes the state 0 or 1 as required depending the combination of 0 and 1 of the six input signals applied from the two three-phase ring counters 85 and 95.

The above description has referred to the case in which three sub-memories are employed. Generally, in a converting system employing m sub-memories, the sub-memories 51a to 51c, read signal gates 63a to 63c, AND gates 45a to 45c, OR gates 55a to 55c, AND gates 65a to 65c, and INHIBIT gates 85a to 85c and 95a to 95c may be replaced by m elements respectively, the three-phase ring counters 85 and 95 may be replaced by m-phase ring counters, and the write permission signal generator 97 may be replaced by a write permission signal generator which delivers a write permission signal when one of the m-phase ring counters is advanced by less than (m − 1) steps compared with the other. The same applies to a narrow-to-broad converting system which will be described below.

Figure 11:
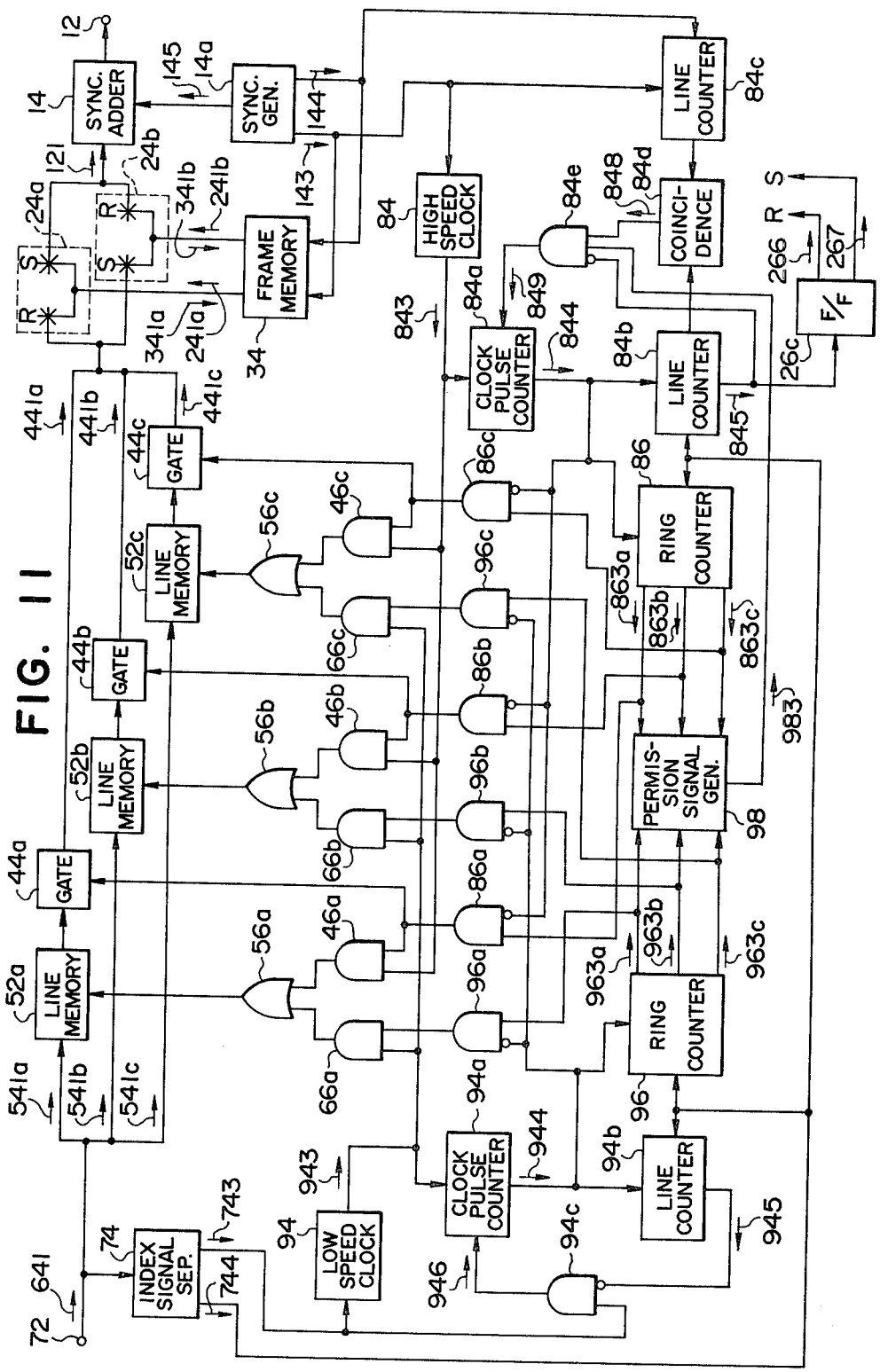
FIG. 11 is a detailed block diagram of another embodiment of the present invention including a plurality of sub-memories arranged in parallel for converting a narrow-band signal into a broad-band signal.

FIG. 11 is a detailed block diagram of a narrow-to-broad converting system which includes three sub-memories arranged in parallel. Referring to FIG. 11, a composite narrow-band picture signal 641 is applied through an input terminal 72 to an index signal separator 74 which separates a line index signal 743 and a frame index signal 744 from the input 641 and shapes such signals. Sub-memories 52a to 52c have a function similar to that of the sub-memories 51a to 51c shown in FIG. 10 and are connected to sub-memory read signal gates 44a to 44c respectively. Write-read change-over switches 24a and 24b are associated with a main memory 34 which has two memory channels and is similar to the main memory 33 shown in FIG. 10 in its function for each channel. A synchronizing signal adder 14 is connected to a synchronizing signal generator 14a which generates a scanning line synchronizing signal 143, a frame synchronizing signal 144 and a composite synchronizing signal 145. A flip-flop 26c controls the change-over switches 24a and 24b with its output. Elements 84, 84a to 84e, 94, and 94a to 94c are similar to the corresponding elements 83, 83a to 83e, 93 and 93a to 93c respectively in FIG. 10. However, the low-speed clock pulse generator 94 in FIG. 11 is started by the line index signal and generates a low-speed clock pulse signal 943 having a frequency of p cycles during the effective frame period. When the narrow-band picture signal 641 arriving at the input terminal 72 includes self-clock information necessary for division into picture elements, such information may be derived from the signal 641 and shaped to obtain the clock pulse signal. Three-phase ring counters 86 and 96 are similar to the counters 85 and 95 in FIG. 10. A read permission signal generator 98 generates a read permission signal 983 to permit read-out during the period of time in which the ring counter 86 is advanced relative to the ring counter 96 so that read-out from a specific sub-memory can be carried out in the state in which writing in this specific memory has been finished. Logic elements 46a to 46c, 56a to 56c, 66a to 66c, 86a to 86c, and 96a to 96c are similar to the corresponding elements 45a to 45c, 55a to 55c, 65a to 65c, 85a to 85c, and 95a to 95c respectively in FIG. 10.

The operation of the narrow-to-broad converting system shown in FIG. 11 will be described with reference to the timing charts shown in FIGS. 12 and 13. When the composite narrow-band frame signal $F'_1$ to be subjected to conversion arrives at the input terminal 72, the frame index signal 744 is separated by the index signal separator 74 and is applied to the scanning line counters 94b, 84b and three-phase ring counters 86, 96 to reset same, and as a result, the outputs of the scanning line counters 94b and 84b, that is, the carries 945 and 845 take the state 0. Therefore, the INHIBIT gates 94c and 84e are opened and the first phase outputs 963a and 863a of the respective three-phase ring counters 96 and 86 take the state 1, thereby initiating the converting operation.

The flip-flop 26c is initially in the state in which the output 266 thereof is 1. Therefore, the first channel of the main memory 34 is in the write condition and the second channel thereof is in the read condition. The line index signal 743 arriving prior to the first line signal L′₁ passes through the gate 94c to reset the clock pulse counter 94a and this counter 94a starts to count the low-speed clock pulses 943 generated by the clock pulse generator 94. The carry 944 takes the state 0 and the output 663a of the INHIBIT gate 96a takes the state 1 to open the AND gate 66a. Thus, the low-speed clock pulse signal 943 passes through this gate 66a to drive the sub-memory 52a and writing of the line signal L′₁ in the sub-memory 52a is started. Writing of the signal L′₁ in the sub-memory 52a is completed when the carry 944 takes the state 1 as a result of counting of p low-speed clock pulses 943 by the clock pulse counter 94a and the gates 96a and 66a are successively closed. At the same time, the carry 944 acts to advance the scanning line counter 94b and three-phase ring counter 96 by one step. Further, the read permission signal 983 of the read permission signal generator 98 takes the state 1 permitting read-out of one signal from the sub-memory 52a. In response to the appearance of the next line index signal 743, the clock pulse counter 94a is reset again and the next line signal L′₂ is written in the sub-memory 52b. These operations proceed in an endless fashion in the order of a, b and c until finally the scanning line counter 94b counts n carries 944 and the gate 94c is closed.

Read-out of the signal L′₁ from the sub-memory 52a is necessarily carried out after the writing of the signal L′₁ in the sub-memory 52a and before initiation of writing of the line signal L′₄ in the sub-memory 52a. The line signal L₁ obtained by reading is transferred to the main memory 34. The signal transfer from the sub-memories 52a, 52b and 52c to the main memory 34 is carried out in suitably timed relation so that the read permission signal generator 98 would not permit simultaneous read-out. The transfer operation is carried out in a manner as described below. When the first line signal L′₁ has been written in the sub-memory 52a and the read permission signal 983 takes the state 1, the scanning line order coincidence pulse generator 84d generates the line coincidence pulse signal 848 at the transfer timing of the line signal 848 passes through the gate 84e to reset the clock pulse counter 84a and the carry 844 takes the state 0 resulting in opening of the gates 86a, 86b, and 86c. Since the ring counter 86 remains in the reset state, the output signal 863a is in the state 1 and 1 appears solely from the gate 86a. Therefore, the read signal gate 44a and AND gate 46a are opened, and the high-speed clock pulse signal 843 generated by the clock pulse generator 84 passes through the AND gate 46a to drive the sub-memory 52a for obtaining the signal L₁ from the sub-memory 52a. This signal L₁ is transferred to the first channel of the main memory 34 through the read signal gate 44a and contact R of the change-over switch 24a. After being reset by the output signal 849 of the INHIBIT gate 84e, the clock pulse counter 84a counts p high-speed clock pulses 843 and the carry 844 takes the state 1. The INHIBIT gate 86a, AND gate 46a and read signal gate 44a are closed to complete the transfer of the signal L₁ to the main memory 34. At the same time, the scanning line counter 84b and ring counter 86 are advanced by one step by the carry 844. When the writing of the line signal L′₂ in the sub-memory 52b is completed or has already been completed at this time, the scanning line order coincidence pulse generator 84d generates the coincidence pulse signal 848 at the transfer timing of the line signal L₂ to the main memory 34. This coincidence pulse signal 848 passes through the gate 84e to reset the clock pulse counter 84a again and the signal L₂ is read out from the sub-memory 52b to be transferred to the main memory 34. Such operation continues until the scanning line counter 84b counts n carries 844 and the carry 845 takes the state 1 thereby closing the gate 84e. Finally, the first channel of the main memory 34 is filled with all the line signals of the frame signal F₁. Further, the carry 845 triggers the flip-flop 26c thereby inverting the output signal of the flip-flop 26c and changing over the change-over switches 24a and 24b so that the first channel of the main memory 34 is now placed in the read-out condition and the second channel thereof is placed in the write-in condition. The broad-band frame signal F₁ repeated with the frame period is read out from the first channel of the main memory 34 and is applied to the synchronizing signal adder 14. The composite synchronizing signal 145 is applied from the synchronizing signal generator 14a to be added to the frame signal F₁ and the composite broad-band picture signal thus obtained is sent out to the exterior from the output terminal 12.

The same converting operation as that above described is carried out upon arrival of the next composite narrow-band frame signal F′₂ at the input terminal 72. Upon completion of the converting operation, the change-over switches 24a and 24b are switched over again so that the broad-band picture signal F₂ can be sent out from the output terminal 12 in lieu of the broad-band picture signal F₁.

When the broad-band picture signal is, for example, a video signal according to the standard television broadcasting system employed in Japan, the effective scanning period ratio is about 82% and the remaining is the horizontal blanking period. Further, the effective scanning line ratio is about 92% and the remaining is the vertical blanking period. Further, when one frame is regarded as a unit, the number of horizontal scanning lines $r$ is $r = 525$ in which the number of effective scanning lines $n$ including picture information is $n = 483$ and the number of scanning lines in the vertical blanking period is 42. When one field is regarded as a unit, the numbers of scanning lines above described are one-half of the respective values. In broad-to-narrow conversion of such signal, all the portions including the blanking period need not be subjected to conversion and the portion containing the picture information may solely be subjected to conversion. Due to the fact that the portion containing the picture information is about 75% of the signal in this example, such manner of conversion is advantageous in that the period of time required for the transfer of the narrow-band picture signal can be reduced by about 25% compared with the case in which all the portions including the blanking period are subjected to conversion. Further, each sub-memory need not have the capacity of storing the entirety of one scanning line and may have a capacity of storing the effective picture portion of one scanning line. Although the signal thus treated does not include the synchronizing signal components, such components may be added after narrow-to-broad conversion. The same applies also to another embodiment which will be described below.

Figure 14:
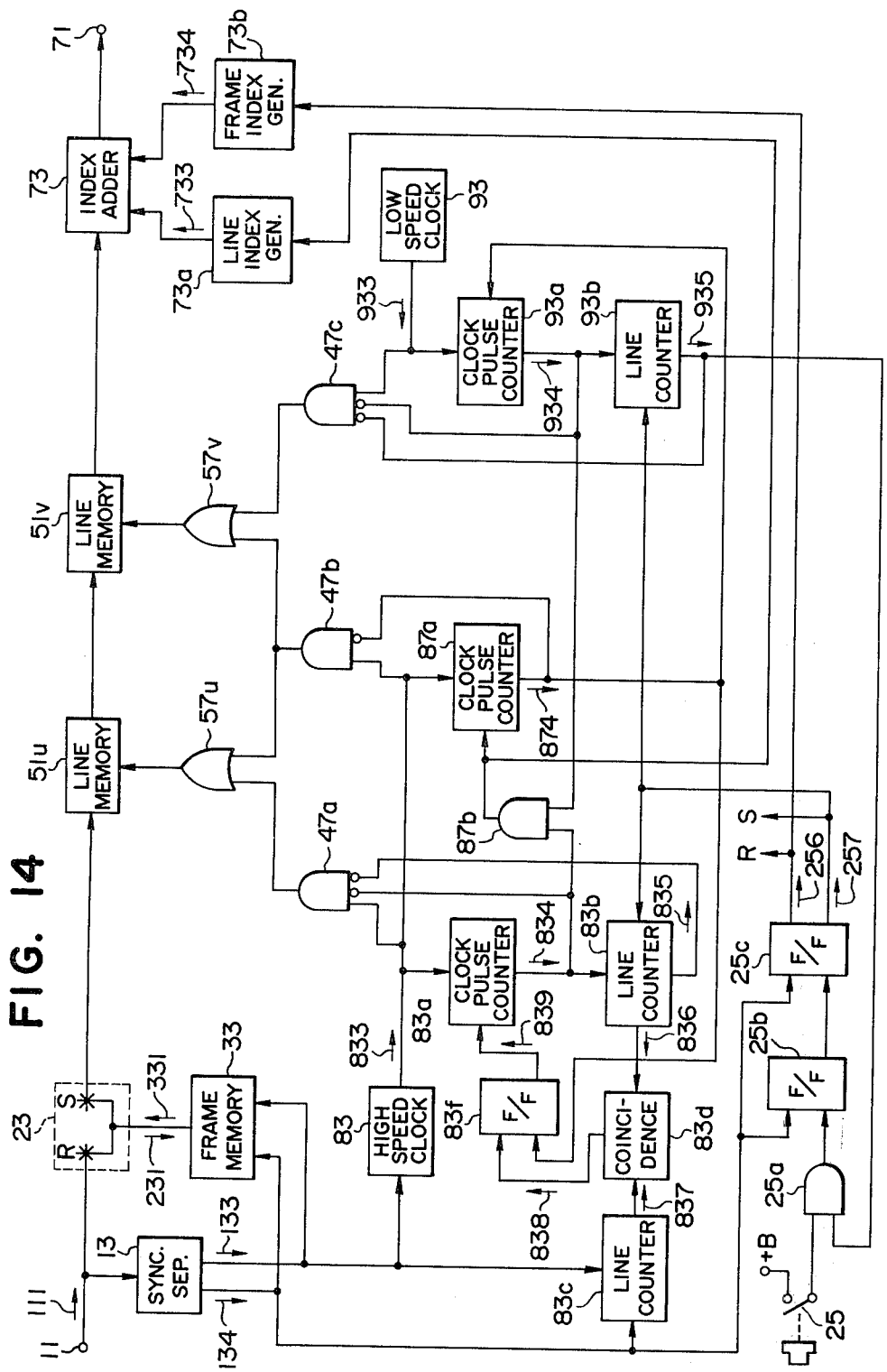
FIG. 14 is a detailed block diagram of another embodiment of the present invention including a pair of sub-memories arranged in series for converting a broad-band signal into a narrow-band signal.

FIG. 14 is a detailed block diagram of another embodiment of the broad-to-narrow converting system of the present invention which includes a pair of sub-memories arranged in series. Referring to FIG. 14, a synchronizing signal separator 13 and a change-over switch 23 are similar to those shown in FIG. 10. Similarly, a conversion instruction switch 25, an AND gate 25a, and flip-flops 25b and 25c constitute a system controller. A main memory 33 and sub-memories 51u and 51v are similar to those shown in FIG. 10. An index signal adder 73, a line index signal generator 73a and a frame index signal generator 73b are also similar to those shown in FIG. 10. A high-speed clock pulse generator 83 and a low-speed clock pulse generator 93 are also similar to those shown in FIG. 10. Clock pulse counters 83a, 87a and 93a count p clock pulses as in FIG. 10, and scanning line counters 83b, 83c and 93b count n scanning lines as in FIG. 19. A scanning line order coincidence pulse generator 83d is also similar to that shown in FIG. 10. The circuit further includes INHIBIT gates 47a to 47c, OR gates 57u, 57v, a flip-flop 83f and an AND gate 87b.

The operation of the broad-to-narrow converting system shown in FIG. 14 will now be described. In the initial condition, the clock pulse counters 83a, 87a, 93a and scanning line counters 83b, 93b are at rest and the carries appearing therefrom are in the state 1. When a composite broad-band picture signal $F_1$ corresponding to a frame to be subjected to conversion arrives at an input terminal 11 and the conversion instruction switch 25 is manipulated, the frame signal $F_1$ is stored in the main memory 33 and the signal read out from the main memory 33 appears at the input of the sub-memory 51u in a manner as described previously. At the beginning of read-out operation, a main memory read control signal 257 appears from the flip-flop 25b to reset the scanning line counters 83b and 93b and the carries 835 and 935 take the state 0, thereby initiating the conversion. The scanning line order coincidence pulse generator 83d generates a coincidence pulse signal 838 at the transfer timing of the first line signal $L_1$ from the main memory 33 to the sub-memory 51u. The flip-flop 83f is set by the signal 838 and the output signal 839 of the flip-flop 83f takes the state 1 thereby resetting the clock pulse counter 83a. The carry 834 takes the state 0 and the gate 47a is opened. As a result, a high-speed clock pulse signal 833 generated by the clock pulse generator 83 passes through the gate 47a and OR gate 57u to drive the sub-memory 51u so that the line signal $L_1$ is transferred from the main memory 33 to the sub-memory 51u. When the clock pulse counter 83a counts p high-speed clock pulses 833, the carry 834 takes the state 1 thereby closing the INHIBIT gate 47a and completing the transfer of the signal $L_1$ from the main memory 33 to the sub-memory 51u. The carry 834 acts to advance the scanning line counter 83b by one step, and at the same time, passes through the AND gate 87b to reset the clock pulse counter 87a. The carry 874 appearing from the clock pulse counter 87a takes the state 1 thereby opening the INHIBIT gate 47b. Therefore, the high-speed clock pulse signal 833 passes through the gates 47b, 57u and 57v to drive the sub-memories 51u and 51v simultaneously so that the line signal $L_1$ stored in the sub-memory 51u is read out therefrom to be transferred to the sub-memory 51v. When the clock pulse counter 87a counts p high-speed clock pulses 833, the carry 874 takes the state 1 thereby closing the INHIBIT gate 47b to complete the transfer of the signal $L_1$ from the sub-memory 51u to the sub-memory 51v. The carry 874 acts to reset the flip-flop 83f and clock pulse counter 93a to prepare for transfer of the next line signal $L_2$ from the main memory 33 to the sub-memory 51u. At the same time, the carry 934 appearing from the clock pulse counter 93a takes the state 0 thereby opening the INHIBIT gate 47c. A low-speed clock pulse signal 933 generated by the clock pulse generator 93 passes through the INHIBIT gate 47c and OR gate 57v to drive the sub-memory 51v so that the signal $L_1$ stored in the sub-memory 51v is read out at a low speed to provide a narrow-band signal $L'_1$.

The scanning line order coincidence pulse generator 83d generates the coincidence pulse signal 838 again at the transfer timing of the signal $L_2$ from the main memory 33 to the sub-memory 51u thereby setting the flip-flop 83f again. The output signal 839 of the flip-flop 83f resets the clock pulse counter 83a again and the signal $L_2$ is transferred from the main memory 33 to the sub-memory 51u. Upon completion of transfer of the signal $L_2$, the carry 834 appearing from the clock pulse counter 83a takes the state 1 and is applied to the AND gate 87b. However, due to the fact that read-out of the preceding signal $L'_1$ from the sub-memory 51v has not yet been completed and the carry 934 appearing from the clock pulse counter 93a is in the state 0, the AND gate 87b remains in the closed position. Upon completion of read-out of the signal $L'_1$ from the sub-memory 51v, the carry 934 takes the state 1 and passes through the gate 87b to reset the clock pulse counter 87a, and the signal $L_2$ is transferred from the sub-memory 51u to the sub-memory 51v. Before the transfer of the signal from the sub-memory 51u to the sub-memory 51v is completed, the carry 874 appearing from the clock pulse counter 87a is in the state 0 and the clock pulse counter 93a is not reset. Thus, the INHIBIT gate 47c remains in the closed position and the next line signal cannot be transferred from the main memory 33 to the sub-memory 51u. That is, the sub-memory 51u carries out signal relaying operation for regulating the read-out timing of a specific line signal from the main memory 33 and the read-out timing of this specific signal from the sub-memory 51v. The above manner of operation is repeated until the scanning line counter 83b counts n carries 834, the carry 835 appearing from the scanning line counter 83b takes the state 1 thereby closing the gate 47a, subsequently the scanning line counter 93b counts n carries 934, and the carry 935 appearing from the scanning line counter 93b takes the state 1 thereby closing the gate 47c. Finally, broad-to-narrow conversion of all the line signals constituting one frame is completed and the entire system is restored to the original non-operative state to stand by for the next conversion. The narrow-band line signals are successively applied to the index signal adder 73, and a line index signal 733 generated by the line index signal generator 73a and a frame index signal 734 generated by the frame index signal generator 73b are added in the adder 73 to the line signals to provide a composite narrow-band picture signal which is sent out to the exterior from an output terminal 71. The structure of this composite narrow-band picture signal is similar to that of the signal 632 shown in FIG. 13.

Figure 15:
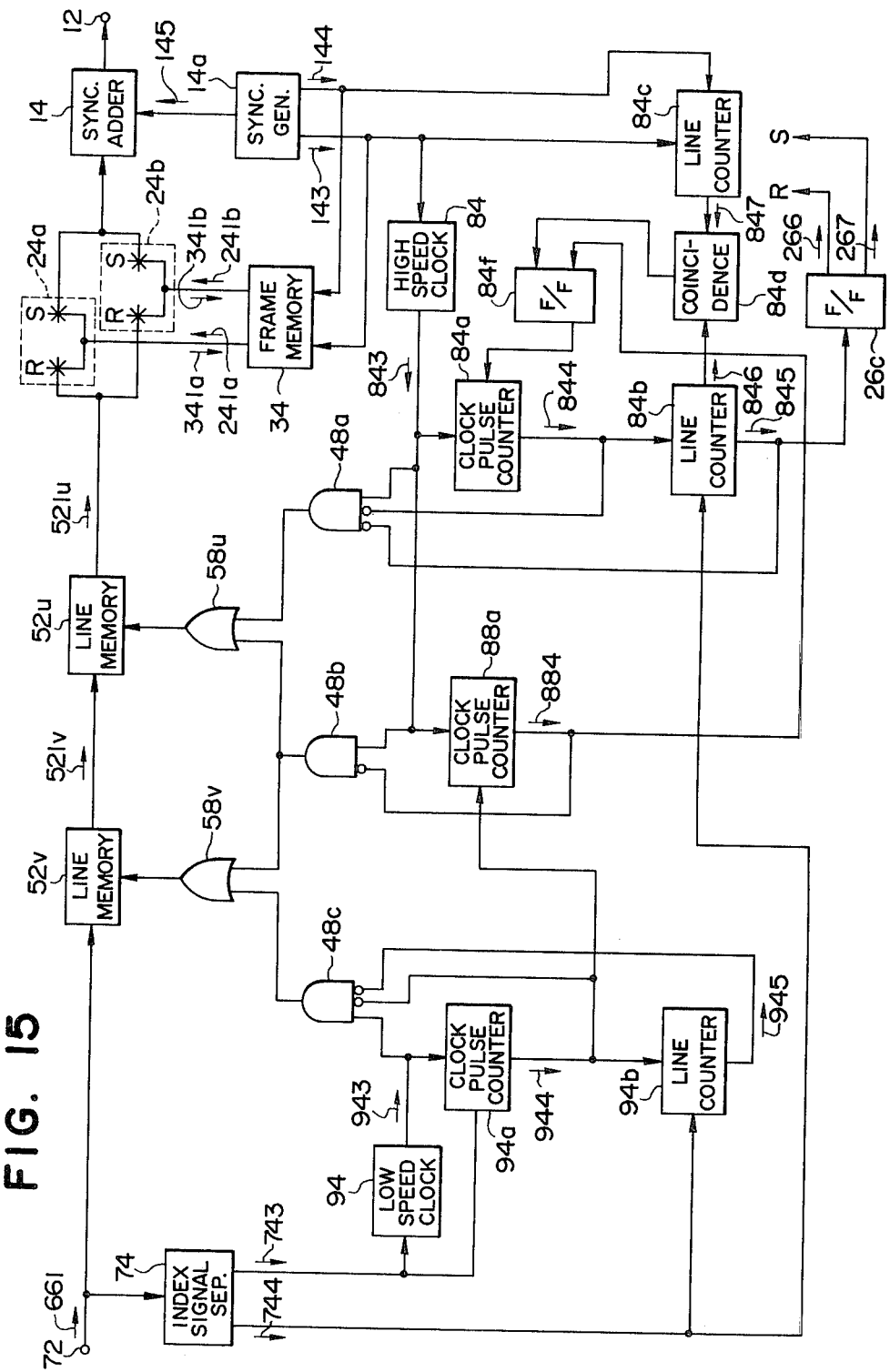
FIG. 15 is a detailed block diagram of another embodiment of the present invention including a pair of sub-memories arranged in series for converting a narrow-band signal into a broad-band signal.

FIG. 15 is a detailed block diagram of another embodiment of the narrow-to-broad converting system of the present invention which includes a pair of sub-memories arranged in series. An index signal separator 74 is similar to that shown in FIG. 11. Sub-memories 52u and 52v and a main memory 34 are also similar to those shown in FIG. 11. Change-over switches 24a, 24b, a high-speed clock pulse generator 84, a low-speed clock pulse generator 94, clock pulse counters 84a, 88a, 94a, scanning line counters 84b, 84c, 94b, and a scanning line order coincidence pulse generator 84d are also similar to those shown in FIG. 11. The circuit further includes a synchronizing signal generator 14a, a synchronizing signal adder 14, flip-flops 26c and 84f, INHIBIT gates 48a to 48c, and OR gates 58u and 58v.

The operation of the narrow-to-broad converting system shown in FIG. 15 will now be described. In the initial condition, the clock pulse counters 94a, 88a, 84a and scanning line counters 94b, 84b are at rest and the carries appearing therefrom are in the state 1. Suppose that initially the output signal 266 of the flip-flop 26c is in the state 1 and the first and second channels of the main memory 34 are ready for writing and reading respectively. When a composite narrow-band frame signal $F'_1$ to be subjected to conversion arrives at an input terminal 72, the frame index signal 744 in the leading portion of the frame signal $F'_1$ is separated by the index signal separator 74 and is applied to the scanning line counters 94b and 84b to reset same. The carries 945 and 845 appearing from the respective counters 94b and 84b take the state 0 and the converting operation is initiated. Then, the line index signal 743 preceding the first line signal $L'_1$ is separated by the index signal separator 74 and is applied to the clock pulse counter 94a to reset same, and the carry 944 appearing from the counter 94a takes the state 0. As a result, the INHIBIT gate 48c is opened and a low-speed clock pulse signal 943 generated by the clock pulse generator 94 passes through the INHIBIT gate 48c and OR gate 58v to drive the sub-memory 52v and writing of the line signal $L'_1$ in the sub-memory 52v is initiated. The clock pulse counter 94a also starts to count the low-speed clock pulses 943, and when it counts $p$ pulses, the carry 944 appearing from the clock pulse counter 94a takes the state 1, thereby closing the gate 48c to complete writing of the signal $L'_1$ in the sub-memory 52v. At the same time, the carry 944 acts to advance the scanning line counter 94b by one step and reset the clock pulse counter 88a. Thus, the carry 884 appearing from the clock pulse counter 88a takes the state 0 thereby opening the gate 48b. As a result, a high-speed clock pulse signal 843 generated by the clock pulse generator 84 passes through this gate 48b to drive the sub-memories 52v and 52u simultaneously and the line signal $L_1$ obtained by reading out the signal $L'_1$ stored in the sub-memory 52v is transferred to the sub-memory 52u. When the clock pulse counter 88a counts $p$ high-speed clock pulses 843, the carry 884 appearing from this counter 88a takes the state 1 thereby closing the gate 48b to complete transfer of the signal $L_1$ from the sub-memory 52v to the sub-memory 52u. At the same time, this carry 884 acts to reset the flip-flop 84f. When, subsequently, a line coincidence pulse signal 848 is generated by the scanning line order coincidence pulse generator 84d at the writing timing of the signal $L_1$ in the main memory 34, this pulse signal 838 sets the flip-flop 84f and the output signal 849 of the flip-flop 84f takes the state 1 thereby resetting the clock pulse counter 84a. The carry 844 appearing from the clock pulse counter 84a takes the state 0 thereby opening the INHIBIT gate 48a and the high-speed clock pulse signal 843 of the clock pulse generator 84 passes through the INHIBIT gate 48a and OR gate 58u to drive the sub-memory 52u. Thus, the signal $L_1$ stored in the sub-memory 52u is transferred to the main memory 34. When the clock pulse counter 84a counts $p$ high-speed clock pulses 843, the carry 844 appearing from the clock pulse counter 84a takes the state 1 thereby closing the gate 48a to complete the transfer of the signal $L_1$ from the sub-memory 52u to the main memory 34. In the operation of the broad-to-narrow converting system described with reference to FIG. 14, the relation $\tau_p \geq T_L$ holds between $\tau_p$ and $T_L$ where $\tau_p$ is the time internal between the line signals in the narrow-band picture signal and $T_L$ is the period of one scanning line in the broad-band picture signal. Therefore, after completion of the transfer of the signal $L_1$ from the sub-memory 52v to the sub-memory 52u, the line index signal for the next line signal $L'_2$ arrives at the input terminal 72. Similarly, this signal $L'_2$ is written into the sub-memory 52v, and upon completion of writing, the signal $L'_2$ is transferred to the sub-memory 52u from the sub-memory 52v. The line signal $L_3$ is then transferred from the sub-memory 52u to the main memory 34 at the specified transfer timing. It will thus be understood that all the line signals in the narrow-band picture signal are successively subjected to narrow-to-broad conversion by the sub-memory 52v, and the sub-memory 52u acts as a signal relaying means for regulating the arriving timing of the line signals and the transfer timing of the line signals to the main memory 34. The above manner of operation is repeatedly carried out until the scanning line counter 94b counts $n$ carries 944 appearing from the clock pulse counter 94a, and the carry 945 appearing from the scanning line counter 94b takes the state 1 thereby closing the gate 48c and until the scanning line counter 84b counts $n$ carries 844 appearing from the clock pulse counter 84a, and the carry 845 appearing from the scanning line counter 84a takes the state 1 thereby closing the gate 48a. In this manner, all the line signals corresponding to one frame are stored in the first channel of the main memory 34 and the converting operation is completed. Subsequently, the carry 845 appearing from the scanning line counter 84b acts to invert the flip-flop 26c thereby changing over the change-over switches 24a and 24b. The first channel of the main memory 34 is now placed in the read-out condition and the picture signal stored therein is applied from the main memory 34 to the synchronizing signal adder 14. In the adder 14, the composite synchronizing signal 145 generated by the synchronizing signal generator 14a is added to the picture signal to provide a composite broad-band picture signal which is sent out to the exterior from an output terminal 12. After the converting operation, the entire converting system is restored to the original non-operative state to wait arrival of a succeeding composite narrow-band frame signal $F'_2$. When the succeeding frame signal $F'_2$ arrives at the input terminal 72, it is stored in the second channel of the main memory 34 after being subjected to narrow-to-broad conversion. Upon completion of converting operation, the change-over switches 24a and 24b are changed over again to send out the succeeding picture signal $F_2$ in lieu of the preceding picture signal $F_1$.

It will be understood from the foregoing detailed description that, according to the first feature of the present invention, a memory, for example, a rotary memory which is relatively inexpensive in the bit unit cost but in which the writing speed and reading speed cannot be easily changed is employed as a frame memory or main memory, while a memory, for example, a stationary memory in which the writing speed and reading speed can be easily changed but which is relatively expensive in the bit unit cost is employed as a scanning line memory or sub-memory, and these memories are combined to provide a picture signal converting means which is economically acceptable in the relation between the cost and the performance. According to the second feature of the present invention, m sub-memories of the kind above described (m is given by the relation $$m \geq 1 + \frac{r+1}{\alpha}$$

where $\alpha^{-1}$ is the band conversion ratio and $r$ is the number of scanning lines constituting one frame) are arranged in parallel, and especially when $m = 2$, such submemories are arranged in series in addition to the parallel arrangement, so as to eliminate wasteful waiting time during signal transfer between the main memory and the sub-memories. Therefore, a reduction can be attained in the period of time during which the narrow-band transmission path is occupied. According to the third feature of the present invention, band conversion is only carried out during the period of the effective picture including picture information carried by the scanning lines constituting one frame and during the period of the effective scanning lines including picture information of one frame. In order to attain the above manner of operation, a counter for counting $p$ picture elements or pulses appearing during the period of the effective picture and another counter for counting $n$ effective scanning lines are provided and the carries appearing from these counters are utilized for controlling the writing and reading periods for the submemories thereby reducing the narrow-band transmission time to a minimum.

We claim:

1. A picture signal band converting system for converting a broad-band picture signal into a narrow-band picture signal comprising a first memory means for recording a picture signal representing one picture and reading out the picture signal repeatedly including a magnetic head, and an endless magnetic recording medium having a capacity of storing a picture signal representing one picture and rotated at a constant speed, a second memory means which has a capacity of storing a picture signal corresponding to at least one scanning line and whose writing and reading speeds are controlled by clock signals, said second memory means being such that such signal can be written therein at the same speed as the speed with which a signal corresponding to one scanning line can be written in or read out from said first memory means, while the signal stored therein can be read out therefrom at any desired speed, means for supplying a picture signal representing one picture to said first memory means for storing said picture signal representing one picture in said first memory means, and means for reading out each individual line signal from said first memory means to write the same in said second memory means, and upon completion of writing, reading out the line signal from said second memory means at a speed lower than the writing speed for delivering same.

2. A picture signal band converting system for converting a broad-band picture signal into a narrow-band picture signal comprising a first memory means for recording a picture signal representing one picture and reading out the picture signal repeatedly including a magnetic head, and an endless magnetic recording medium having a capacity of storing a picture signal representing one picture and rotated at a constant speed, a plurality of second memory means each of which has a capacity of storing a picture signal corresponding to at least one scanning line and whose writing and reading speeds are controlled by clock signals, each said second memory means being such that such signal can be written therein at any desired speed and read out therefrom at any desired speed, means for supplying a picture signal representing one picture to said first memory means for storing said picture signal representing one picture in said first memory means and reading out repeatedly the stored signal with the frame period so that the individual line signals constituting the frame can be successively derived from said picture signal according to the order of the scanning lines to be successively written in said plural second memory means at the same speed as the speed with which the individual line signals are written in said first memory means, and means for reading out the individual line signals successively from said plural second memory means according to the order of the scanning lines at a low speed determined by the required frequency band.

3. A band converting system as claimed in claim 2, wherein each said second memory means has a capacity of storing the true picture signal portion only of each individual line signal except the blanking period, and means for writing the true picture signal portion only of each individual line signal read out from said first memory means are added to said means which read out the line signals from said first memory means to write same in said plural second memory means.

4. A picture signal band converting system for converting a broad-band picture signal into a narrow-band picture signal comprising a first memory means for recording a picture signal representing one picture and reading out the picture signal repeatedly including a magnetic head, and an endless magnetic recording medium having a capacity of storing a picture signal representing one picture and rotated at a constant speed, a second memory means which has a capacity of storing a picture signal corresponding to at least one scanning line and whose writing and reading speeds are controlled by clock signals, said second memory means being such that such signal can be written therein at any desired speed and read out therefrom at any desired speed, a third memory means which has the same capacity as that of said second memory means and whose writing and reading speeds are controlled by the clock signals, said third memory means being such that a line signal can be written therein and read out therefrom during the same period of time as that required for writing and reading out the line signal in and from said first memory means, means for writing a picture signal representing one picture in said first memory means, and upon completion of writing, repeatedly reading out the stored picture signal from said first memory means to write the line signal in said third memory means starting from the first scanning line, said means being further operative to read out said line signal from said third memory means to write said line signal in said second memory means upon completion of writing, and at the same time, to stand by for writing the succeeding line signal in said third memory means as soon as such signal is read out from said first memory means, means for reading out said preceding line signal stored in said second memory means at a low speed determined by the required frequency band, and upon completion of reading, reading out said succeeding line signal from said third memory means to write same in said second memory means at the writing and reading speed of said third memory means, and means for continuously actuating all the means above described until the picture signal stored in said first memory means is entirely read out through said second memory means.

5. A band converting system as claimed in claim 4, wherein each of said second and third memory means has a capacity of storing the true picture signal portion only of each individual line signal except the blanking period.

6. A picture signal band converting system for converting a narrow-band picture signal into a broad-band picture signal comprising a first memory means for recording a picture signal representing one picture and reading out the picture signal repeatedly including a magnetic head, and an endless magnetic recording medium having a capacity of storing a picture signal representing one picture and rotated at a constant speed, a second memory means which has a capacity of storing a picture signal corresponding to at least one scanning line and whose writing and reading speeds are controlled by clock signals, said second memory means being such that such signal can be written therein at any desired speed and read out therefrom at the same speed as the speed with which a line signal is commonly transmitted, means for writing each individual intermittently supplied line signal of a broad-to-narrow converted one picture signal in said second memory means at a low speed corresponding to the speed with which said line signal is supplied, and upon completion of writing, reading out said line signal from said second memory means at a high speed corresponding to the speed of the broad-band one picture signal for writing said line signal in said first memory means, said means repeating the above manner of operation until all the line signals constituting the are written in said first memory means according to the order of the scanning lines, and means for continuously and repeatedly reading out from said first memory means the one picture signal written in said first memory means.

7. A picture signal band converting system for converting a narrow-band picture signal into a broad-band picture signal comprising a first memory means for recording a picture signal one picture and reading out the picture signal repeatedly including a magnetic head, and an endless magnetic recording medium having a capacity of storing a picture signal representing one picture and rotated at a constant speed, a plurality of second memory means each of which has a capacity of storing a picture signal corresponding to at least one scanning line and whose writing and reading speeds are controlled by clock signals, each said second memory means being such that such signal can be written therein at any desired speed and read out therefrom at the same speed as the speed with which a line signal is commonly transmitted, means for writing individual separately supplied line signals of a broad-to-narrow converted one picture signal in said plural second memory means according to the order of the scanning lines at a low speed corresponding to the speed with which said line signals are supplied, and upon completion of writing, reading out said line signals from said plural second memory means at a high speed corresponding to the speed of the broad-band picture signal for writing said line signals in said first memory means according to the order of the scanning lines, means for writing the succeeding line signals of the narrow-band picture signal again in said plural second memory means at said low speed upon completion of read-out from said second memory means, said means repeating the above manner of operation until all the line signals constituting one picture are written in said first memory means according to the order of the scanning lines, and means for continuously and repeatedly reading out from said first memory means the one picture signal written in said first memory means.

8. A band converting system as claimed in claim 7, wherein each said second memory means has a capacity of storing the true picture signal only of each individual line signal except the blanking period, and means for writing the line signals read out from said plural second memory means in said first memory means at time intervals corresponding to the blanking period are added to said means which read out the line signals stored in said second memory means to write same in said first memory means according to the order of the scanning lines constituting one frame.

9. A picture signal band converting system for converting a narrow-band picture signal into a broad-band picture signal comprising a first memory means for recording a picture signal representing one picture and reading out the picture signal repeatedly including a magnetic head, and an endless magnetic recording medium having a capacity of storing a picture signal representing one picture and rotated at a constant speed, a second memory means which has a capacity of storing a picture signal corresponding to at least one scanning line and and whose writing and reading speeds are controlled by clock signals, said second memory means being such that such signal can be written therein at any desired speed and read out therefrom at any desired speed, a third memory means which has the same capacity as that of said second memory means and and whose writing and reading speeds are controlled by the clock signals, said third memory means being such that a line signal can be written therein and read out therefrom at the same speed with which such signal is written in and read out from said first memory means, means for writing each individual intermittently supplied line signal of a broad-to-narrow converted one picture signal in said second memory means at a low speed corresponding to the speed with which said line signal is supplied, and upon completion of writing, reading out said line signal from said second memory means at a high speed corresponding to the speed of the broad-band picture signal for writing said line signal in said third memory means, said means being further operative to write the succeeding line signal of the narrow-band picture signal in said second memory means at said low speed upon completion of writing, means for writing the preceding line signal stored in said third memory means in said first memory means at said high speed during the period of time in which the succeeding line signal is being written in said second memory means, said means repeating the above manner of operation until all the line signals constituting the one picture are written in said first memory means according to the order of the scanning lines by the repetition of the low-speed writing and high-speed reading of the line signals for said second and third memory means, and means for repeatedly reading out the one picture signal at a high speed from said first memory means.

10. A band converting system as claimed in claim 9, wherein each of said second and third memory means has a capacity of storing the true picture signal portion only of each individual line signal except the blanking period, and means for writing the line signals read out from said second memory means in said first memory means at time intervals corresponding to the blanking period are added to said means which read out the line signal stored in said second memory means to write same in said first memory means according to the order of the scanning lines constituting one frame.

* * * * *